United States Patent
Nakahara et al.

(10) Patent No.: US 11,513,296 B2
(45) Date of Patent: Nov. 29, 2022

(54) OPTICAL COMPONENT, OPTICAL CONNECTION COMPONENT WITH GRADED INDEX LENS, AND METHOD OF MANUFACTURING OPTICAL COMPONENT

(71) Applicant: NAKAHARA OPTO-ELECTRONICS LABORATORIES, INC., Mito (JP)

(72) Inventors: Motohiro Nakahara, Mito (JP); Kazuhiro Nakahara, Mito (JP); Katsuya Ohtomo, Mito (JP); Shohei Ogura, Mito (JP); Masahiro Shiotani, Mito (JP)

(73) Assignee: NAKAHARA OPTO-ELECTRONICS, Ibaraki (JP)

( * ) Notice: Subject to any disclaimer, the term of this patent is extended or adjusted under 35 U.S.C. 154(b) by 0 days.

(21) Appl. No.: 16/638,908

(22) PCT Filed: Jun. 25, 2019

(86) PCT No.: PCT/JP2019/025027
§ 371 (c)(1),
(2) Date: Feb. 13, 2020

(87) PCT Pub. No.: WO2020/004354
PCT Pub. Date: Jan. 2, 2020

(65) Prior Publication Data
US 2021/0109291 A1    Apr. 15, 2021

(30) Foreign Application Priority Data
Jun. 29, 2018  (JP) .............................. JP2018-124686

(51) Int. Cl.
*G02B 6/00*    (2006.01)
*G02B 6/32*    (2006.01)
*G02B 3/00*    (2006.01)

(52) U.S. Cl.
CPC ............. *G02B 6/32* (2013.01); *G02B 3/0018* (2013.01); *G02B 3/0087* (2013.01)

(58) Field of Classification Search
CPC ....... G02B 3/0018; G02B 3/0087; G02B 6/32
(Continued)

(56) References Cited

U.S. PATENT DOCUMENTS

| 3,827,785 A | 8/1974 | Matsushita et al. |
| 2004/0114862 A1 | 6/2004 | Taniyama et al. |

(Continued)

FOREIGN PATENT DOCUMENTS

| JP | 51-21594 | 7/1976 |
| JP | 59-41934 | 10/1984 |

(Continued)

OTHER PUBLICATIONS

Koichi Nishizawa, "Opticals of Refractive Index Distribution Type Lens", published by the Laser Society of Japan, Laser Research, vol. 8, No. 5, pp. 748-758, (1980) with partial English translation.

(Continued)

*Primary Examiner* — Kaveh C Kianni
(74) *Attorney, Agent, or Firm* — Ohlandt, Greeley, Ruggiero and Perle, LLP

(57) ABSTRACT

An optical component having an NA conversion function which enables arraying without lowering a product yield, with small size and a simple assembly process.

There is provided an optical component using a capillary type lens array in which plural graded index lenses each of which is surrounded with glass capillary in all circumferential directions, in which a refractive index distribution constant of the plurality of graded index lenses at one end of the optical component in an optical axis direction of the graded index lens is smaller than a refractive index distribution constant of the plurality of graded index lenses at (Continued)

other end of the optical component in the optical axis direction of the graded index lens.

5 Claims, 23 Drawing Sheets

(58) Field of Classification Search
USPC .......................................................... 385/33
See application file for complete search history.

(56) References Cited

U.S. PATENT DOCUMENTS

| | | | |
|---|---|---|---|
| 2005/0111102 A1* | 5/2005 | Iwatsuka | G02B 6/2746 |
| | | | 359/490.02 |
| 2005/0147345 A1* | 7/2005 | Hata | G02B 6/2938 |
| | | | 385/24 |
| 2008/0049563 A1* | 2/2008 | Konno | G11B 7/124 |
| 2008/0193082 A1* | 8/2008 | Hamada | G02B 1/045 |
| | | | 385/124 |
| 2008/0219620 A1* | 9/2008 | Lindlein | G02B 6/262 |
| | | | 385/33 |
| 2011/0182082 A1* | 7/2011 | Ide | H01S 5/147 |
| | | | 362/553 |
| 2016/0025935 A1* | 1/2016 | Ide | G02B 6/421 |
| | | | 385/24 |
| 2019/0121026 A1 | 4/2019 | Fukuda et al. | |
| 2020/0003969 A1* | 1/2020 | Yamashita | G02B 6/4214 |

FOREIGN PATENT DOCUMENTS

| | | |
|---|---|---|
| JP | 2-126108 | 10/1990 |
| JP | 4-330402 | 11/1992 |
| JP | 7-88234 | 9/1995 |
| JP | 2004-133176 | 4/2004 |
| JP | 2004-157403 | 6/2004 |
| JP | 2009086039 A * | 4/2009 |
| WO | 2008023578 | 2/2008 |
| WO | 2017/175493 | 10/2017 |
| WO | 2019044055 | 3/2019 |

OTHER PUBLICATIONS

International Search Report dated Sep. 17, 2019 from corresponding PCT International Patent Application No. PCT/JP2019/02502.

* cited by examiner

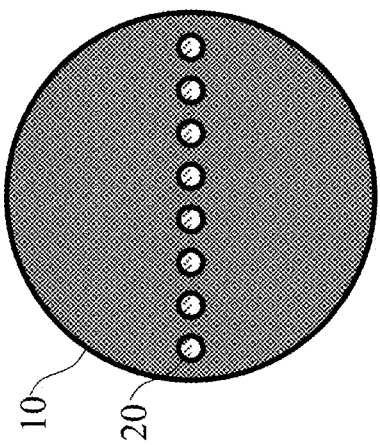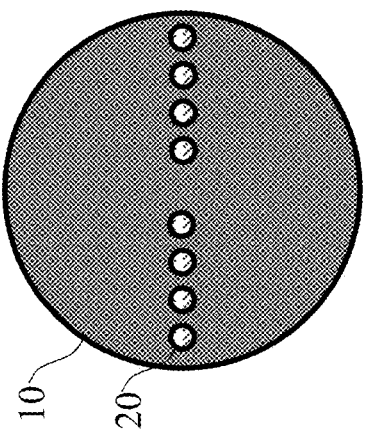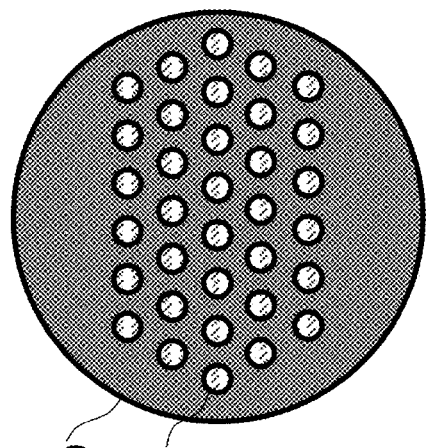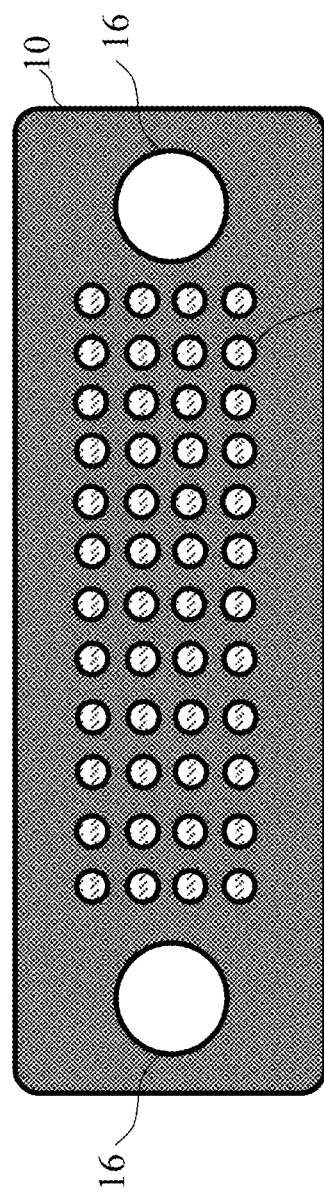
FIG.10

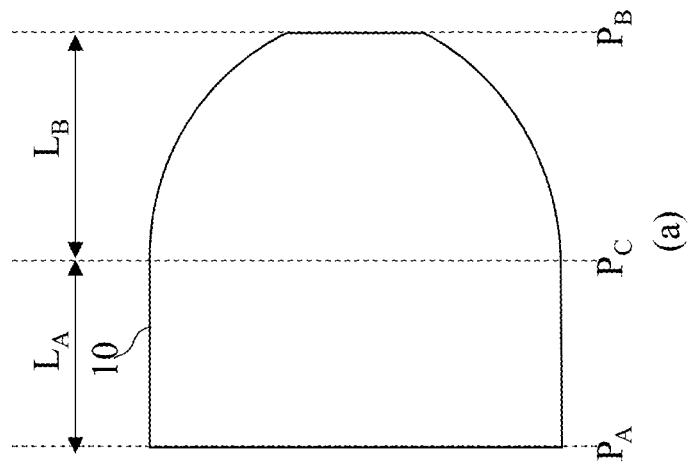
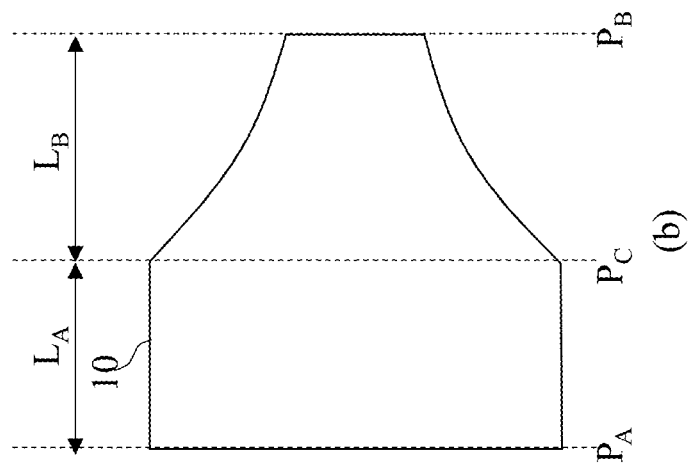
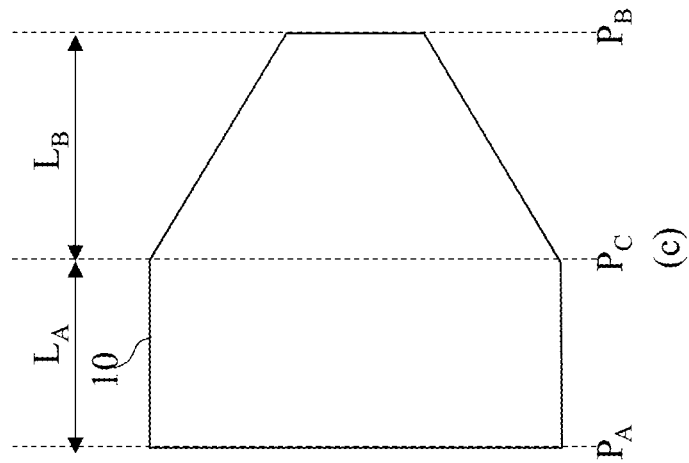
FIG.17

OPTICAL COMPONENT, OPTICAL CONNECTION COMPONENT WITH GRADED INDEX LENS, AND METHOD OF MANUFACTURING OPTICAL COMPONENT

BACKGROUND

1. Field of the Disclosure

The present disclosure relates to an optical component using a capillary type lens array in which a plurality of graded index lenses is arranged in a capillary, an optical connection component with a graded index lens including the optical component, and a method of manufacturing the optical component.

2. Discussion of the Background Art

A graded index lens has a function as an optical lens by continuously changing the refractive index of a glass in the radial direction while the entering and emitting end face is a plane (for example, see Non-Patent Literature 1). Since the graded index lens can easily make emitted light into a collimated light beam, focal image formation, divergent light flux, etc. by the design of its length, etc., it is utilized in a variety of fields such as endoscope lens, in vivo endomicroscopy, 2-photon microscope, intracerebral imaging, coupling lens of laser and isolator, etc. and optical fiber, copying machine, scanner optical system, etc.

In general, in an optical system such as a microscope, an object is observed with a numerical aperture (NA) of an objective lens set to a predetermined magnification and resolution, and image-formed by an eyepiece lens of a relatively small NA. The optical system in the graded index lens is also similar, and graded index lenses of various NAs are commercially available at present. It has become possible to assemble various optical devices by combining these graded index lenses with different NAs.

The NA of the graded index lens is given by Equation (1).

[Equation 1]

$$NA=\sqrt{n_0^2-n_1^2} \quad (1)$$

Here, $n_0$ is a refractive index at the optical axis of the graded index lens, and $n_1$ is a value at the position where the refractive index is the lowest at the most peripheral portion of the graded index lens.

There is a method for changing the refractive index of a glass material as a method for changing the NA of the graded index lens (e.g., refer to Patent Literatures 1 to 3). In other words, by fixing the refractive index $n_1$ of the most peripheral portion in Equation (1), the NA becomes large by making the $n_0$ large, the NA becomes small by making the no small. It is possible to change $n_0$ by changing the amount of metallic elements contained in the glass material of the graded index lens. Metal elements for this purpose are germanium, titanium, zircon, boron, fluorine, etc. for the graded index lens of the quartz system, and silver ions, lithium ions, etc. are typical in the method of manufacturing the graded index lens by the ion diffusion method using a glass of the multicomponent system.

As described above, a single of graded index lens with different NA is generally used thus far. Recently, the need for a one-dimensional or two-dimensional arrayed graded index lens is increasing high in order to obtain spatial information as well as a graded index lens of a single eye. NA-changed and arrayed graded index lens are used in order to obtain spatial intensity distribution of fluorescence in a living body with a desired resolution and so on.

In order to manufacture an arrayed graded index lens, a graded index lens as many as the number of arrays is first prepared, and these are placed and aligned on a V-groove substrate composed of precisely machined glass or crystal or the like as a material. At this time, the end face of the graded index lens is essential to be optically polished, also the length of the lens must be precisely controlled in relation to the focal length. A glass or crystal lid is then placed over the upper side of the array-shaped graded index lens and fixed using an ultraviolet-curing adhesive or the like.

In order to manufacture a graded index lens having different NAs on both sides of the graded index lens and being arrayed, it is necessary to follow a step that is more complicated and difficult to control dimensions than to manufacture a conventional arrayed graded index lens as described above.

First, at least two types or more of graded index lenses are prepared in which no is different by changing the metal element content, these are precisely cut and polished in accordance with the focal length or the length of the design of each NA, and, depending on the combined design of the NA, they are connected by an adhesive or fusion splicing or the like to form a graded index lens with different NA at both ends. They are manufactured individually by the number of arrays. Then, the following procedures are carried out in which these NA conversion type graded index lenses are aligned using a V-groove substrate or the like, covered by a lid such as a glass plate or the like, and fixed with an adhesive. At this moment, both the lateral and longitudinal dimensions of the array must be precisely aligned. Therefore, since the manufacturing process is complicated as compared with the conventional graded index lens array, and a large number of element components are assembled, it is difficult to precisely control the dimensions, and thus, there has been a problem that the manufacturing yield is extremely low. Furthermore, the process is long, leading to a corresponding increase in cost.

CITATION LIST

Patent Literature

Patent Literature 1: Japanese Examined Patent Application, Publication No. S51-021594
Patent Literature 2: Japanese Examined Patent Application, Publication No. S59-041934
Patent Literature 3: Japanese Examined Patent Application, Publication No. H07-088234

Non Patent Literature

Non Patent Literature 1: Koichi Nishizawa, "Opticals of Graded index lens", published by the Laser Society of Japan, "Laser Research", Vol. 8, No. 5, pp. 748 to 758, (1980)

SUMMARY

Brief Description of the Drawings

Detailed Description of the Preferred Embodiment

Technical Problem

Figure 1:
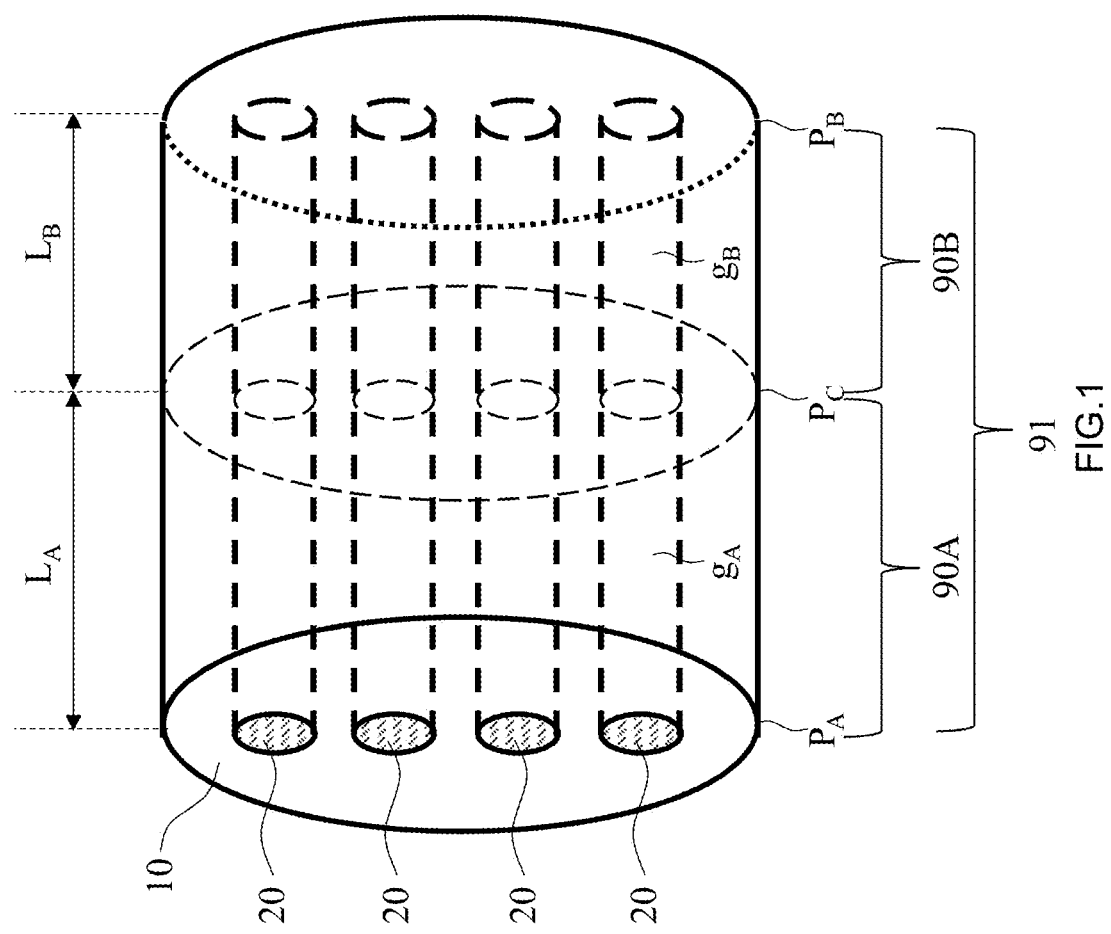

It is an object of the present disclosure to provide an optical component having an NA conversion function which enables arraying without lowering a product yield, with small size and a simple assembly process.

Solution to Problem

According to the present disclosure,
there is provided an optical component using a capillary type lens array composed of plural graded index lenses each of which is surrounded with glass in all circumferential directions, in which a refractive index distribution constant of the plurality of graded index lenses at one end of the optical component in an optical axis direction of the graded index lens is smaller than a refractive index distribution constant of the plurality of graded index lenses at other end of the optical component in the optical axis direction of the graded index lens.

An optical connection component with a graded index lens of the present disclosure includes an optical component of the present disclosure, and a plurality of optical fibers connected to the graded index lens disposed at one end of the optical component.

The optical connection component with a graded index lens of the present disclosure includes an optical component of the present disclosure, and a multi-core fiber connected to the other end of the optical component.

According to the present disclosure,
there is provided a method of manufacturing an optical component, the optical component being manufactured by connecting a plurality of capillary type lens arrays composed of plural graded index lenses each of which is surrounded with glass in all circumferential directions, the method including:

a melt-drawing step of manufacturing the plurality of capillary type lens arrays by melt-drawing a rod of glass in which a graded index lens is disposed for each of individual capillary type lens arrays, wherein a refractive index distribution constant of each of graded index lenses provided in the capillary type lens arrays is equal within a common capillary type lens array and differs for each of the capillary type lens arrays, outer shapes of the capillary type lens arrays at a cross section perpendicular to an optical axis direction of the graded index lens are equal for each of the capillary type lens arrays, and each of the graded index lenses provided in the capillary type lens arrays is disposed at a predetermined position with the outer shapes as a reference, and has a predetermined length for each of the capillary type lens arrays; and a connecting step of connecting each of the graded index lenses provided in the capillary type lens arrays by connecting the capillary type lens arrays in an optical axis direction of the graded index lens so that the outer shapes of the capillary type lens arrays coincide.

Advantageous Effects of Invention

According to the present disclosure, it is possible to provide an optical component having an NA conversion function which enables arraying without lowering a product yield, with small size and a simple assembly process.

BRIEF DESCRIPTION OF THE DRAWINGS

Figure 2:
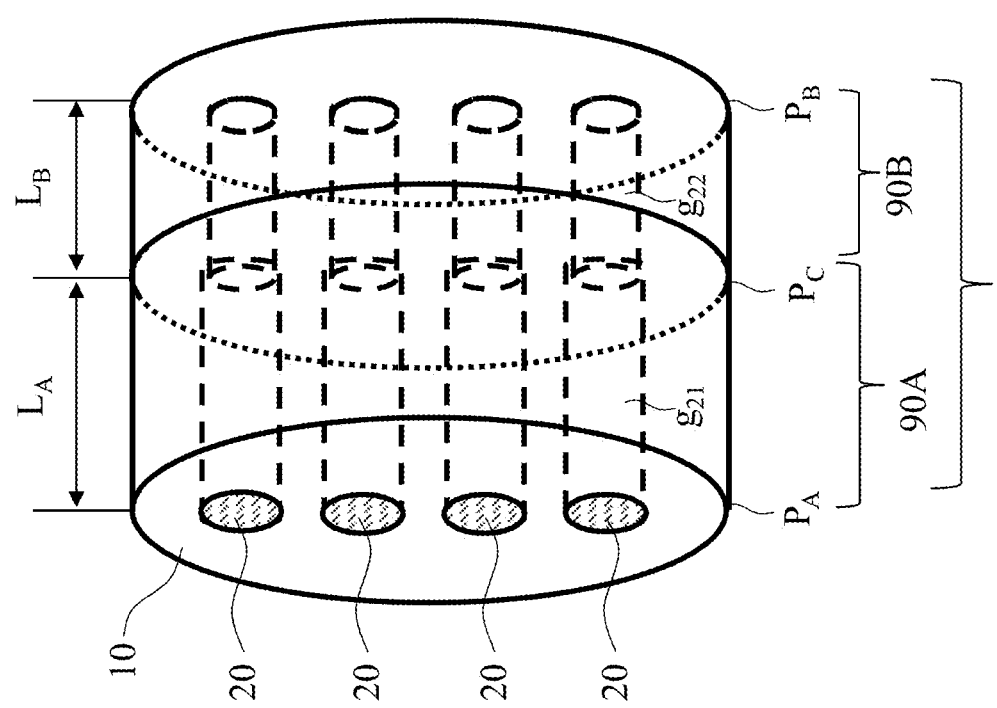
Figure 3:
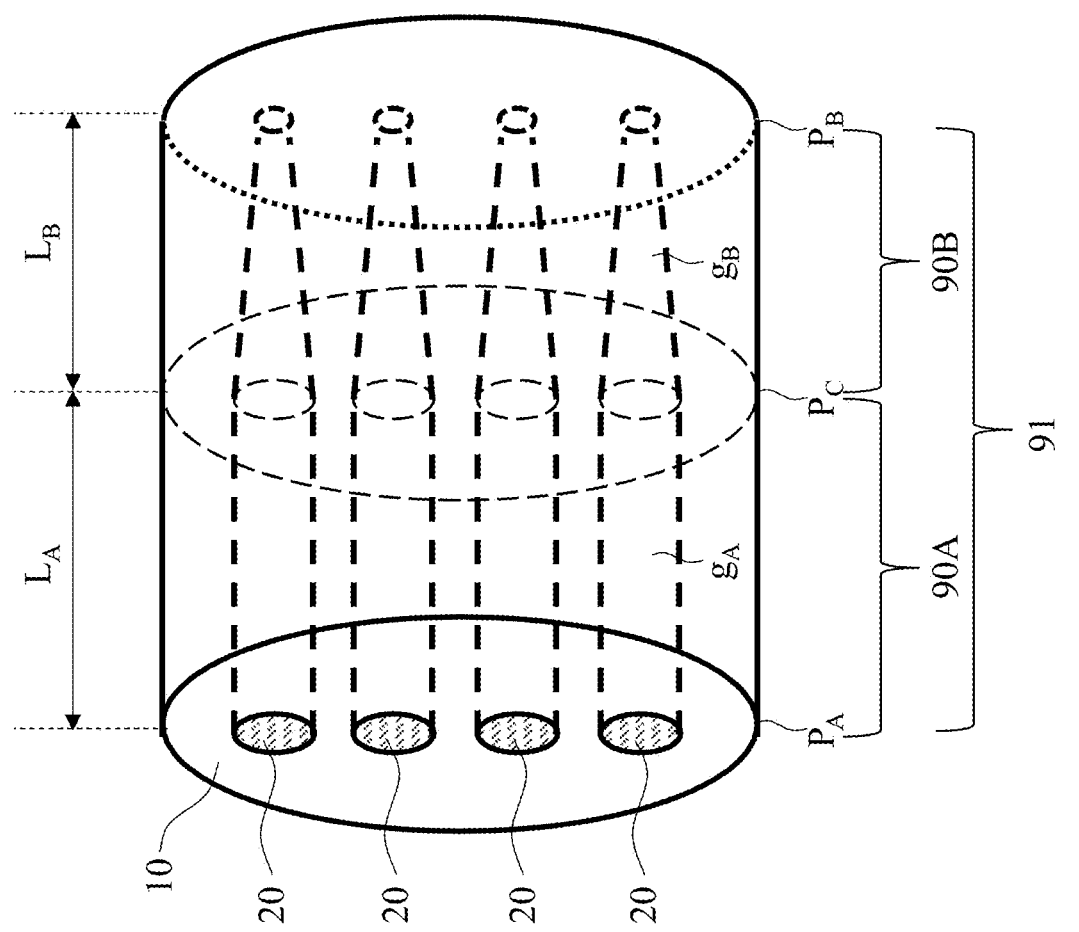
Figure 4:
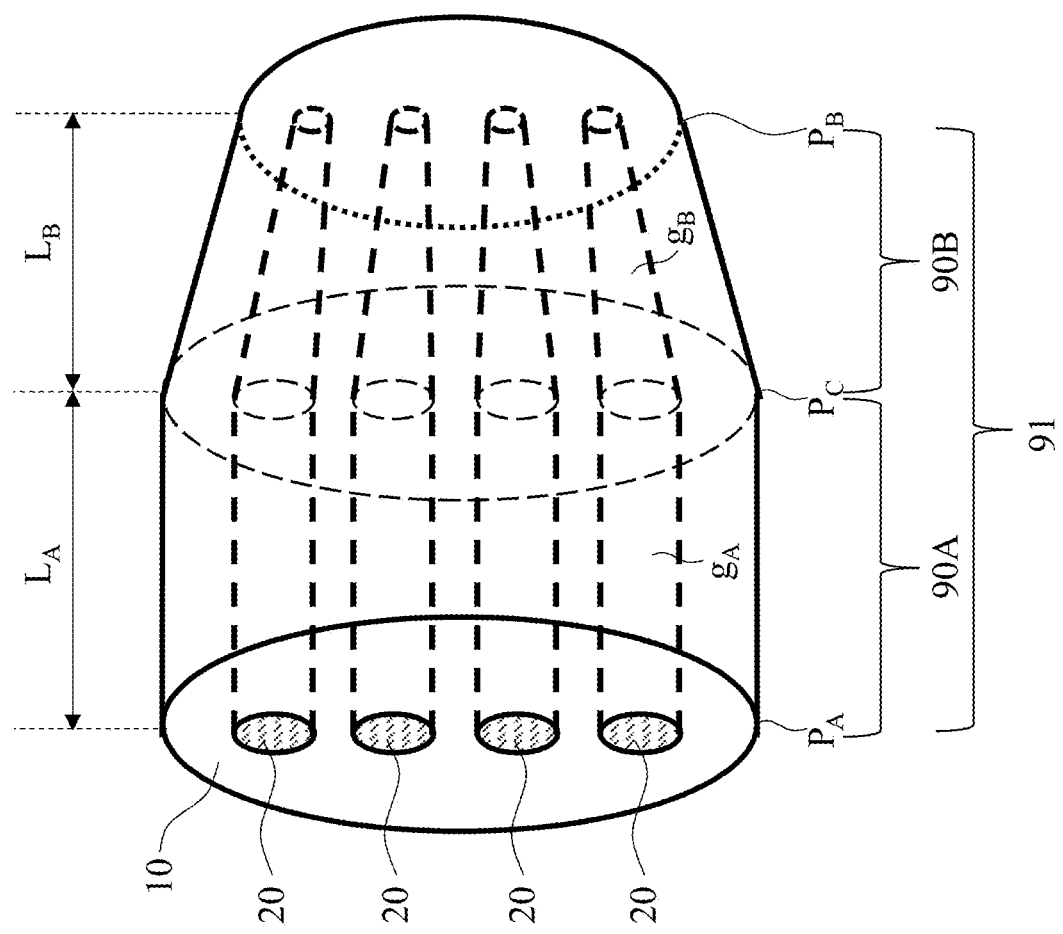
Figure 5:
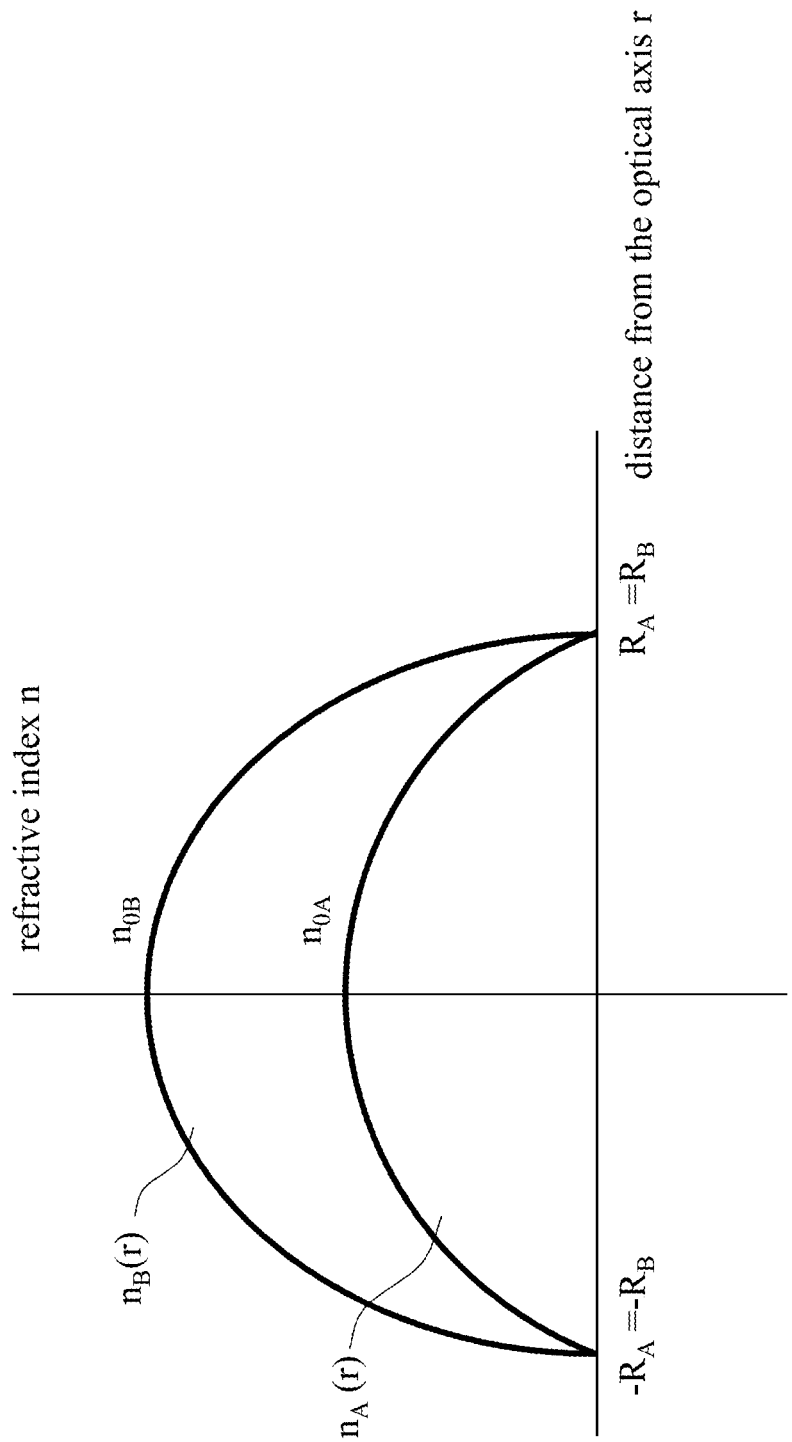
Figure 6:
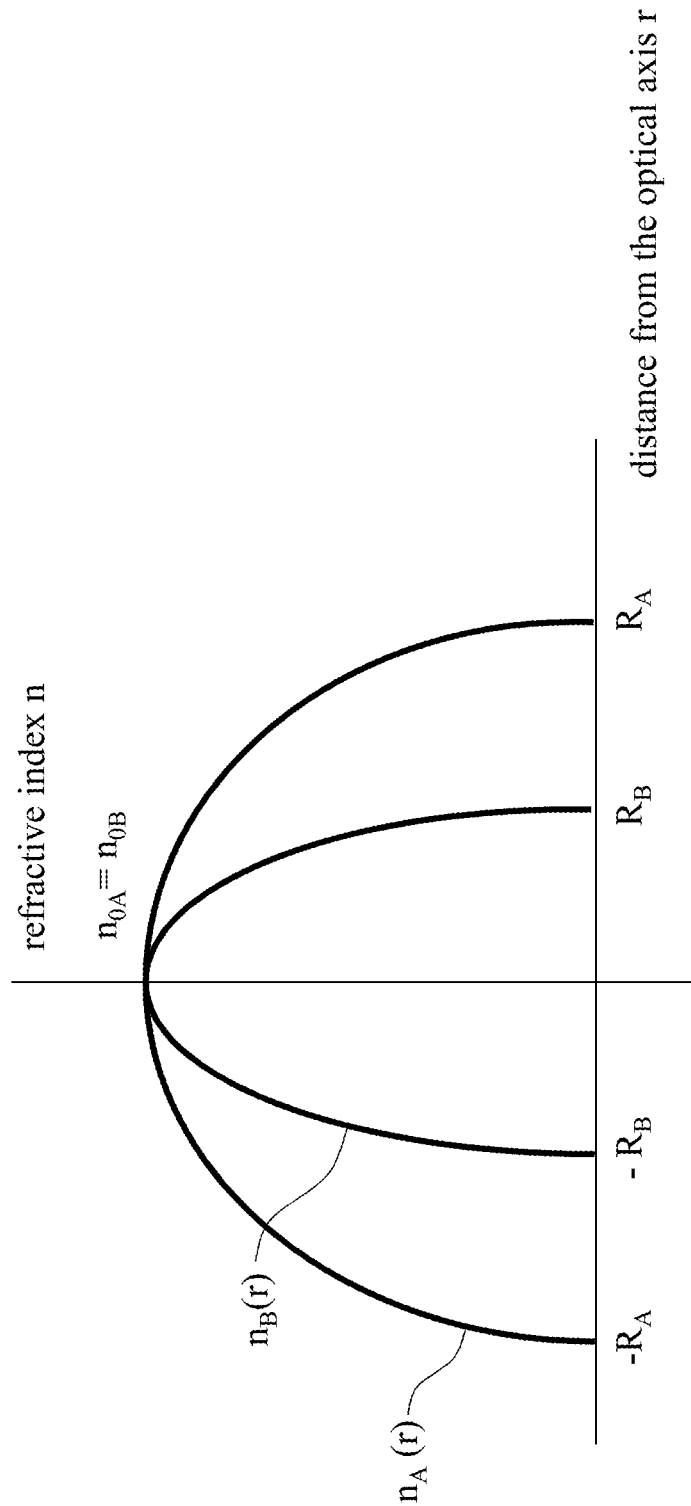
Figure 7:
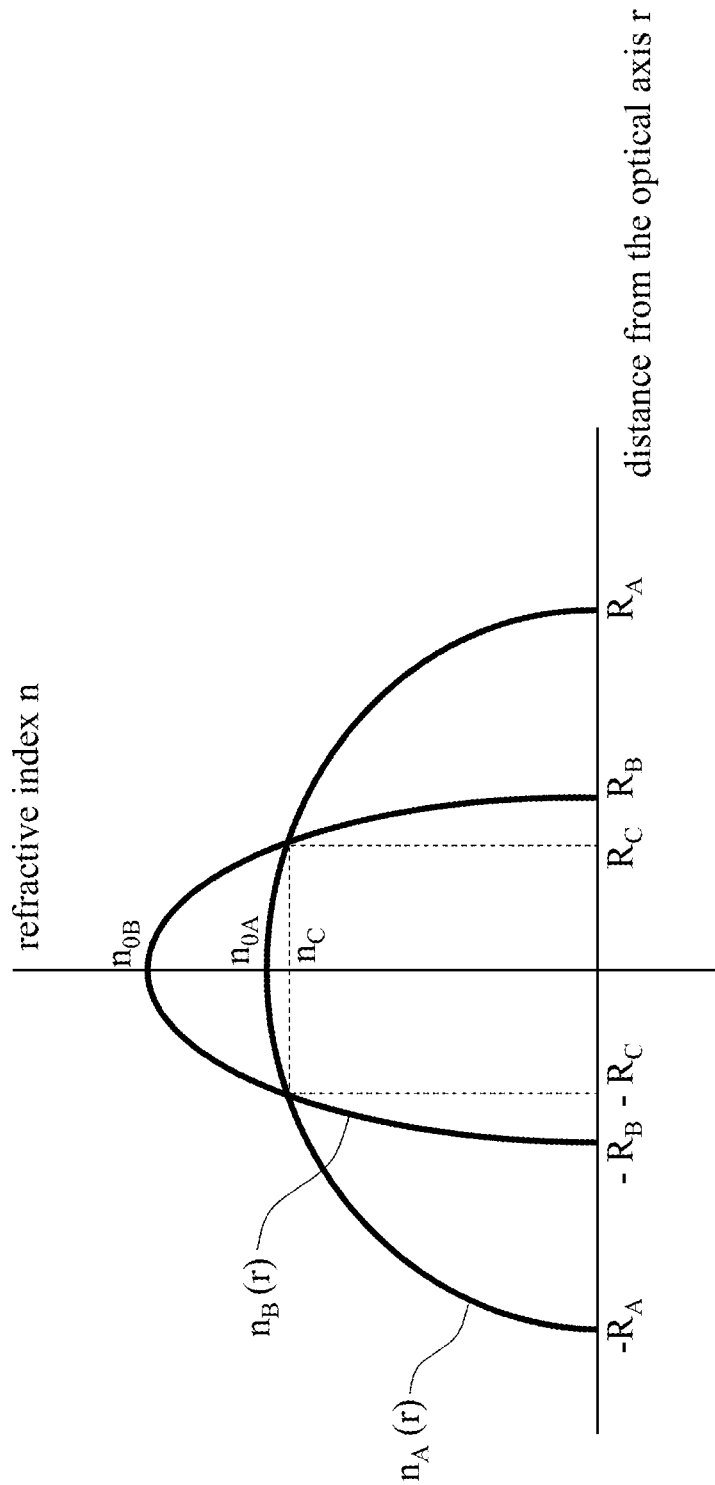
Figure 8:
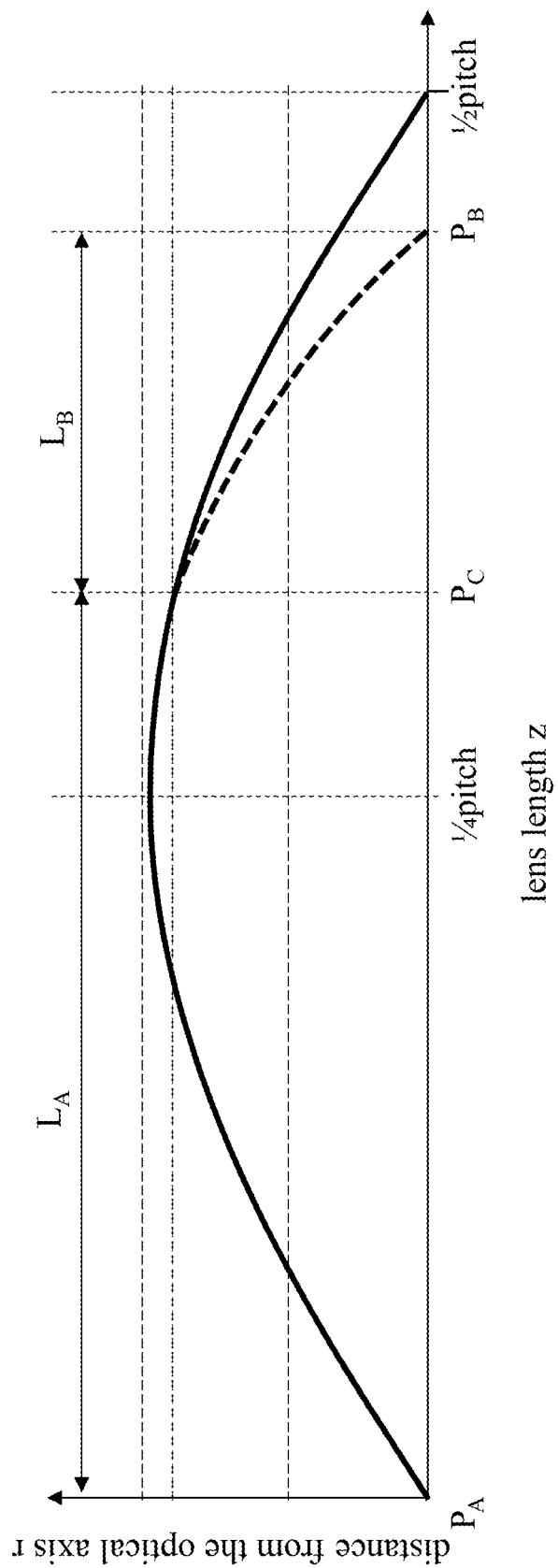
Figure 9:
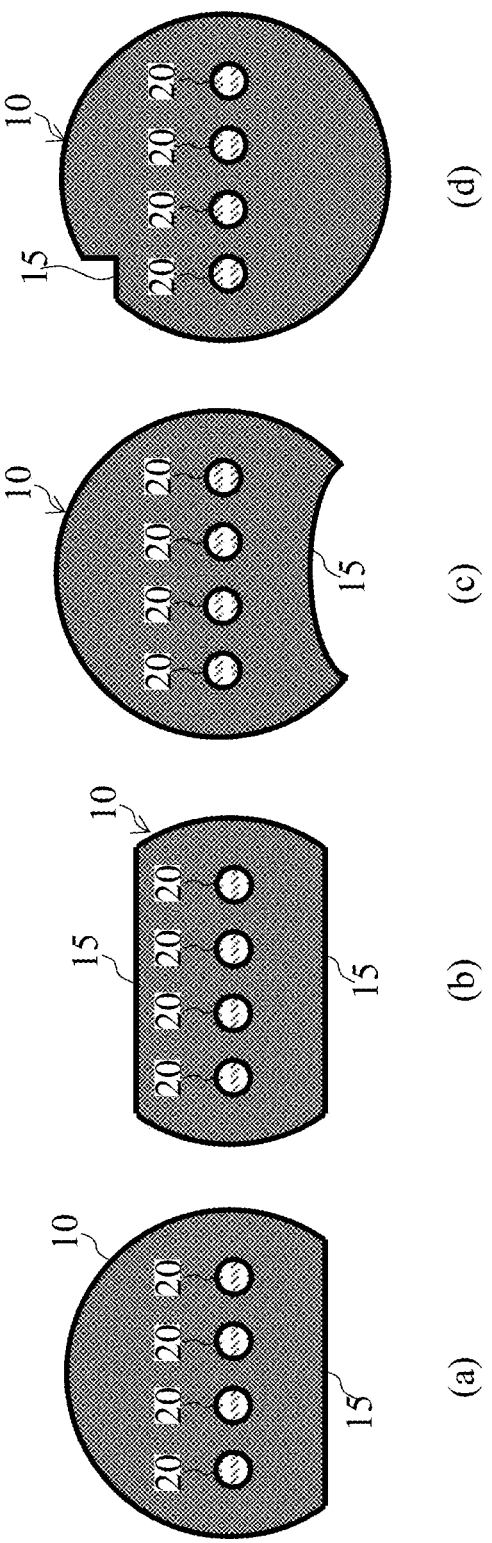
Figure 11:
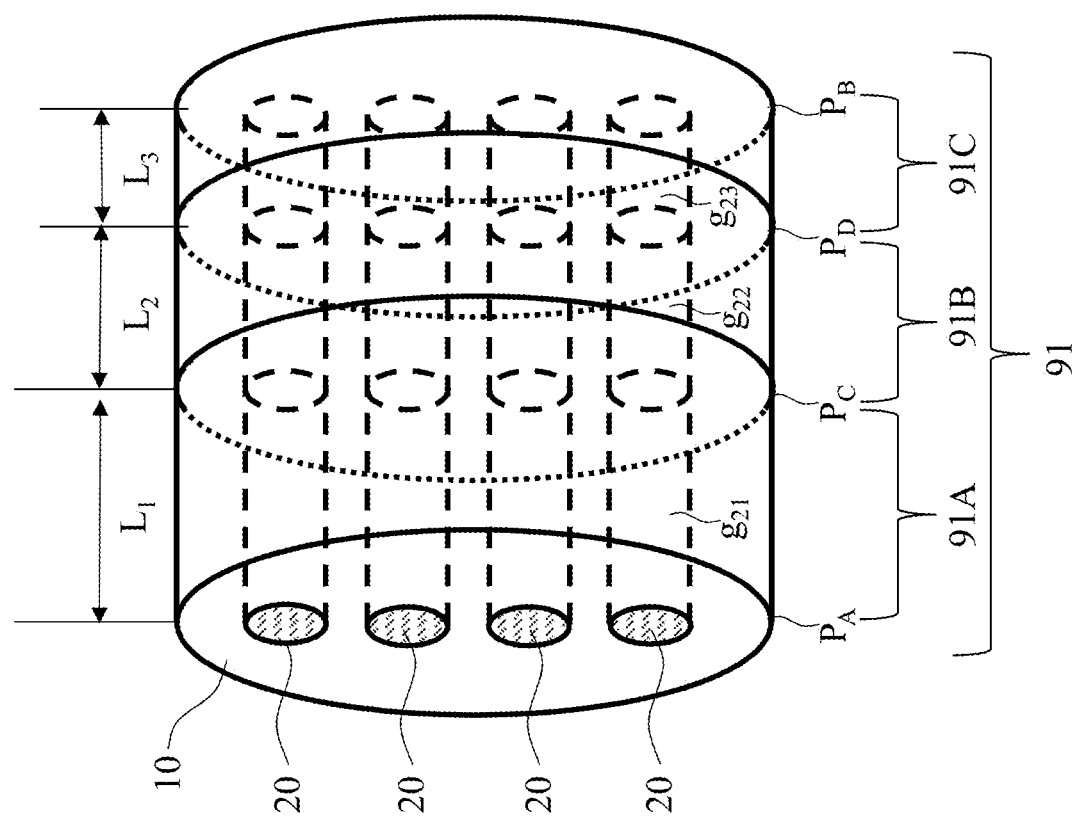
Figure 12:
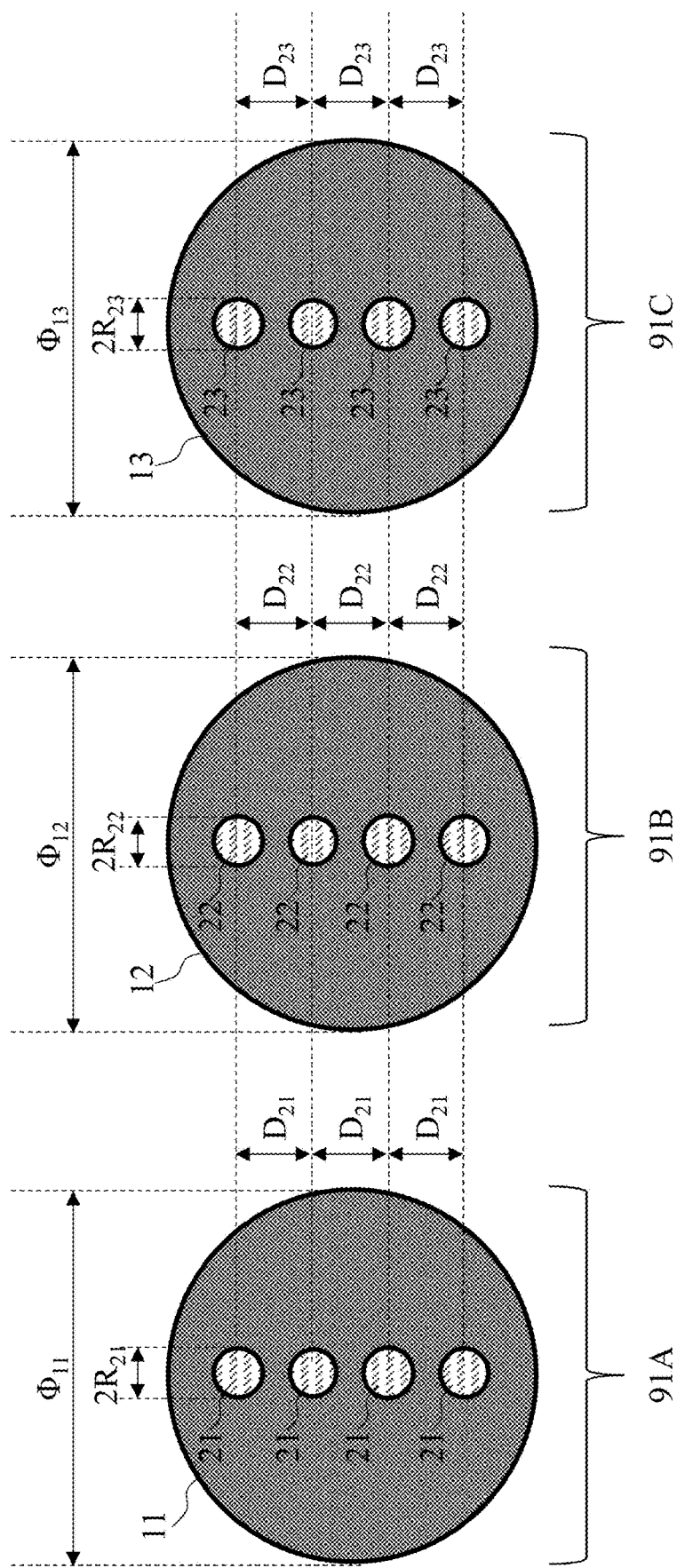
Figure 13:
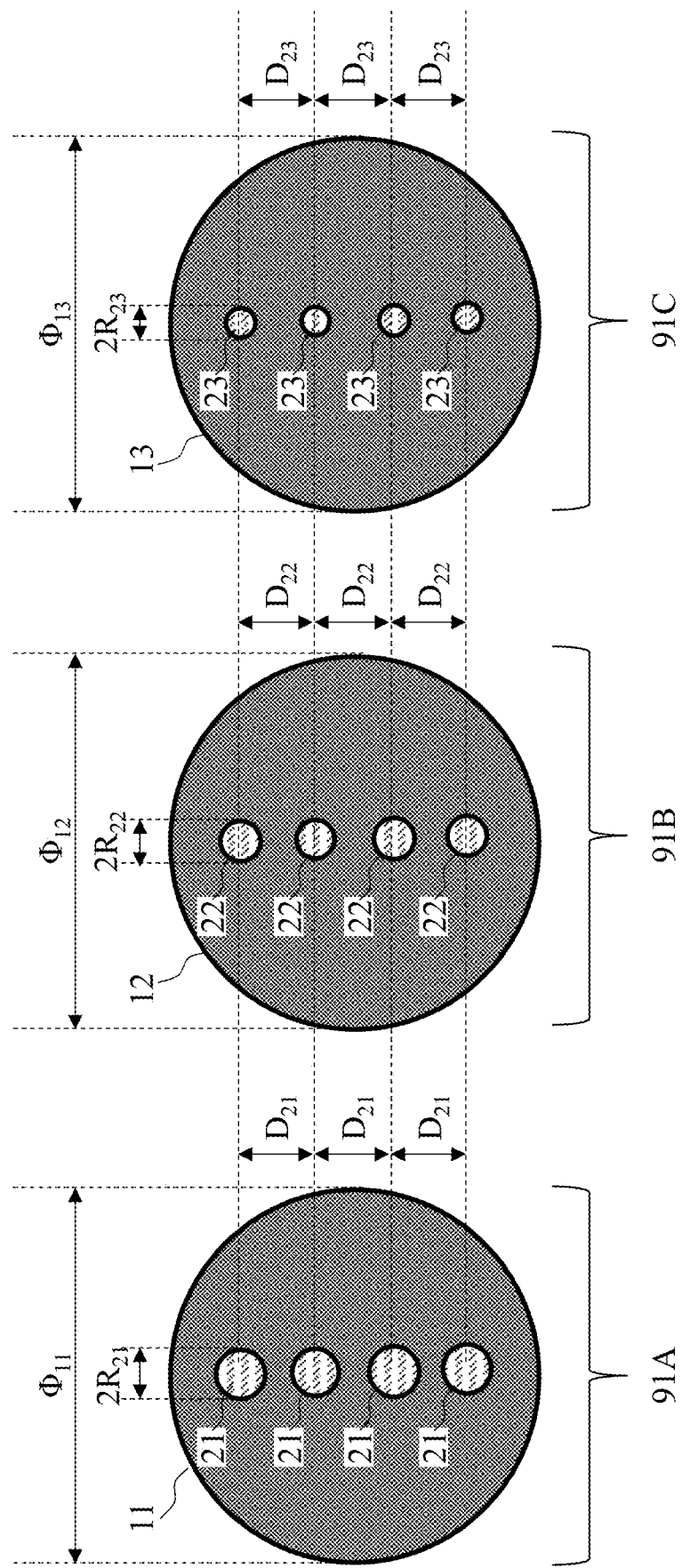
Figure 14:
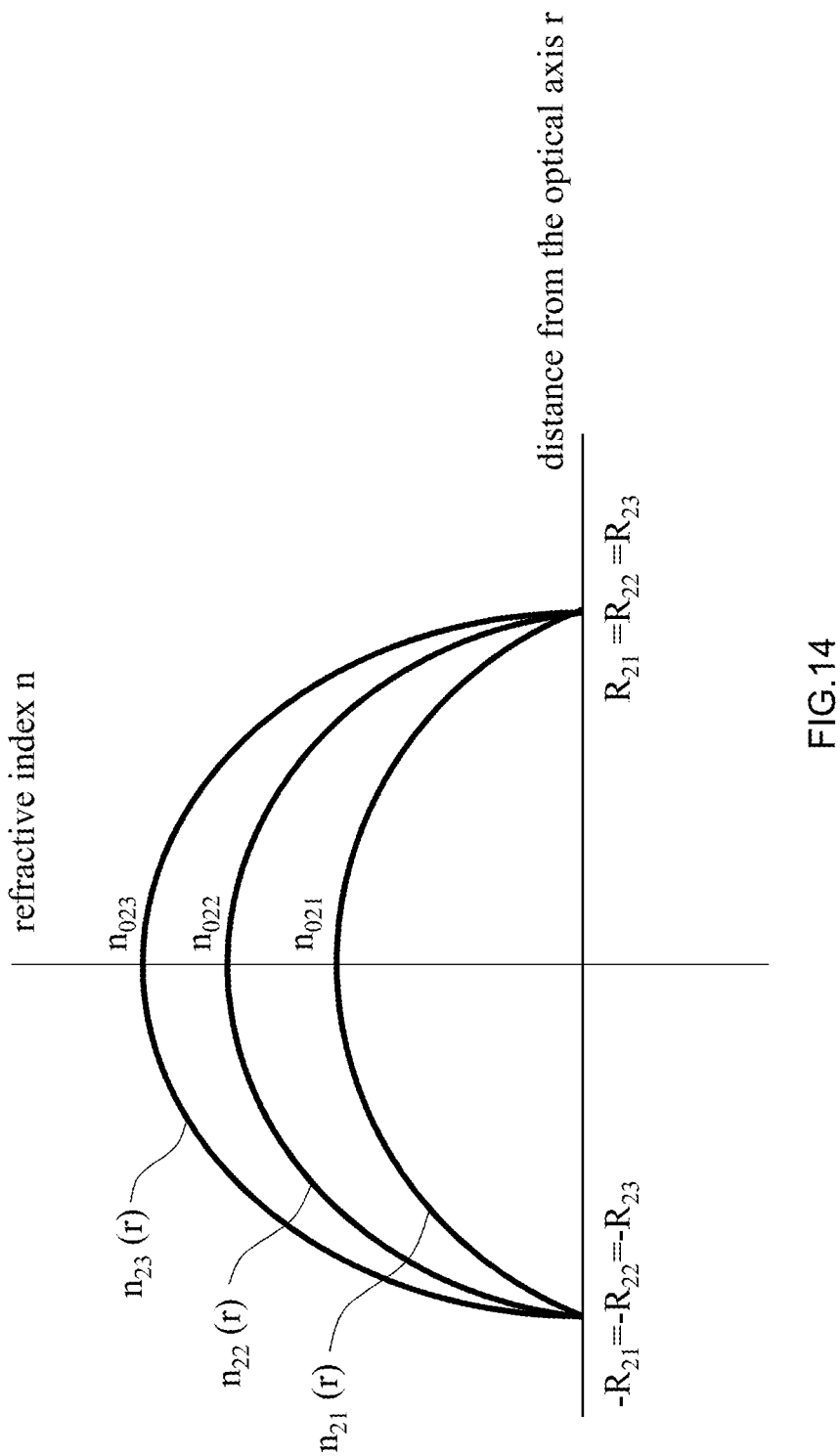
Figure 15:
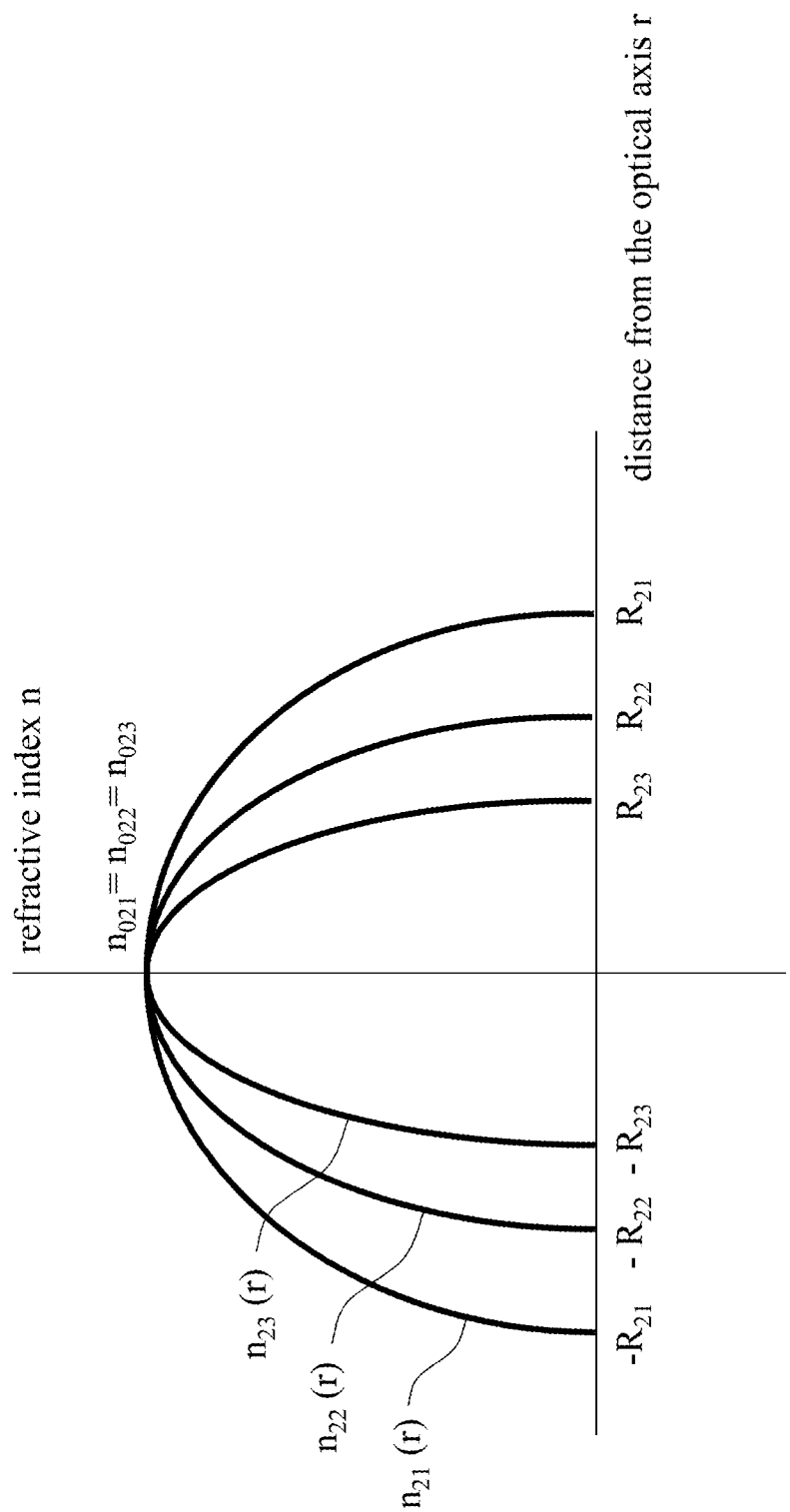
Figure 16:
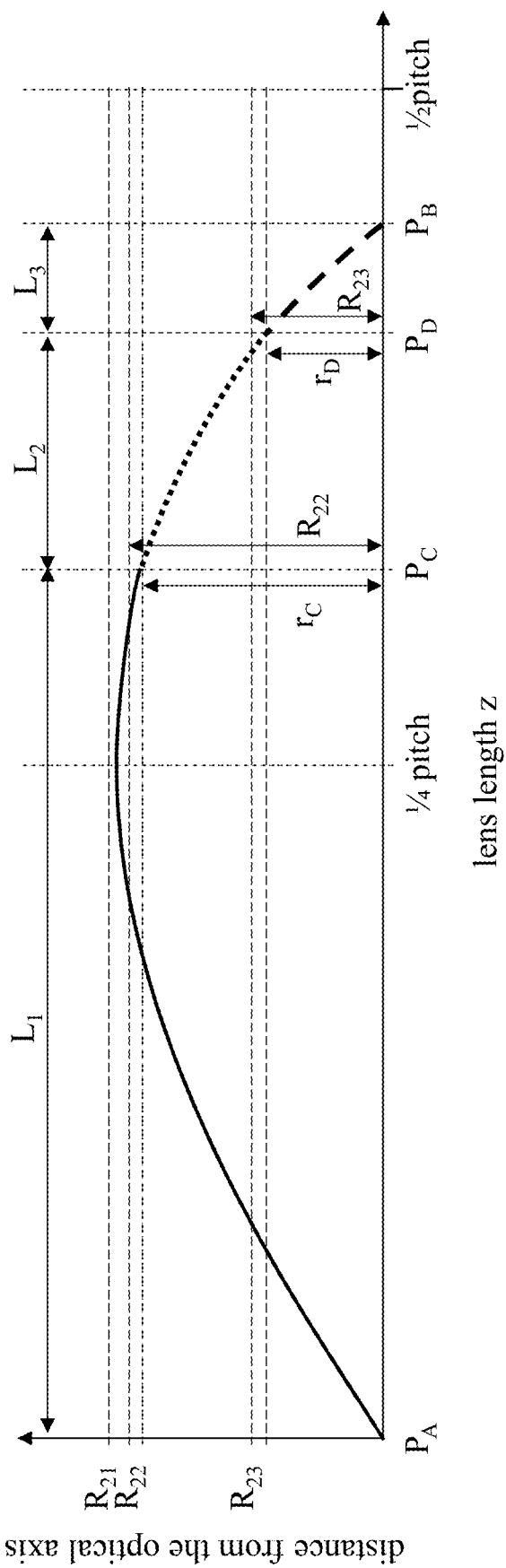
Figure 18:
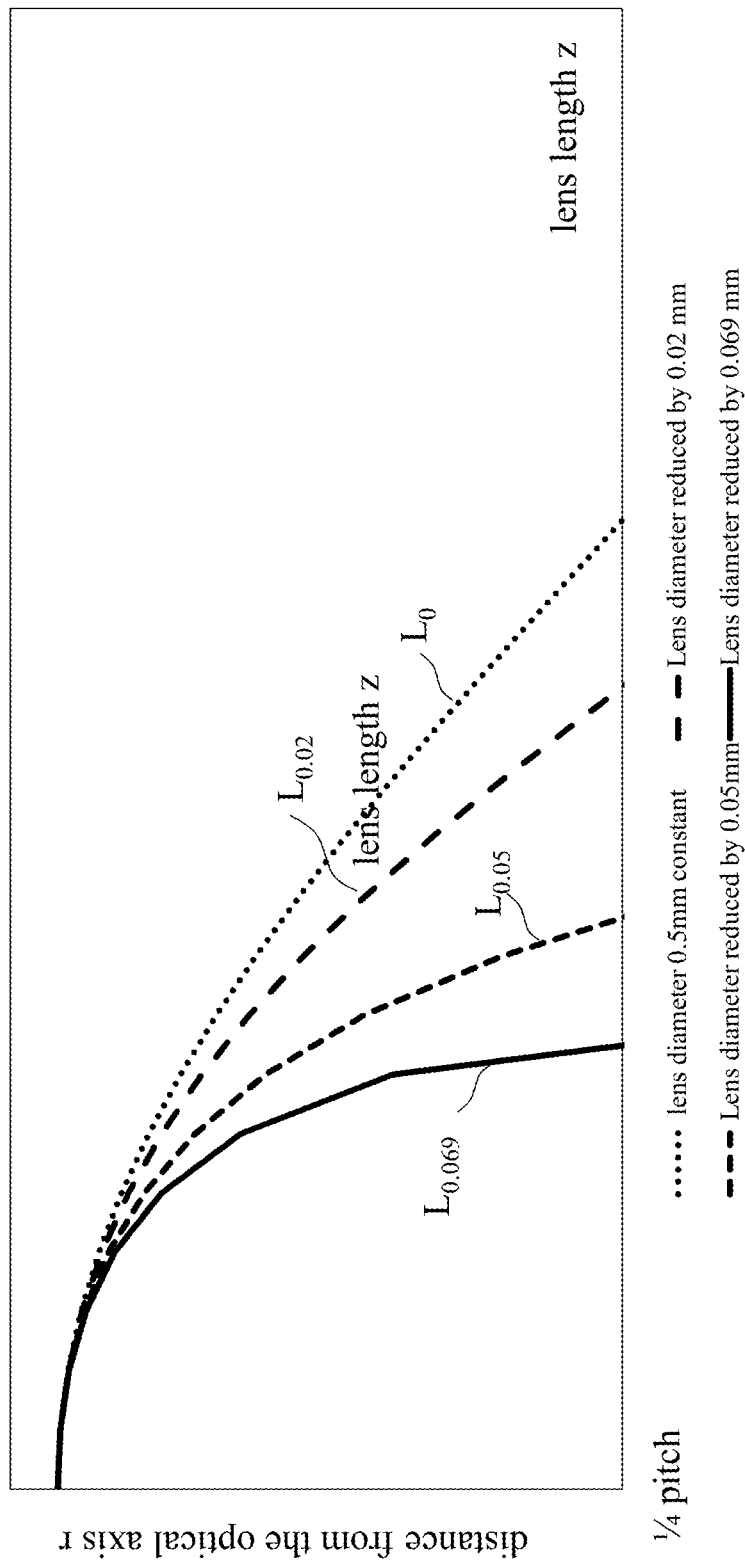
Figure 19:
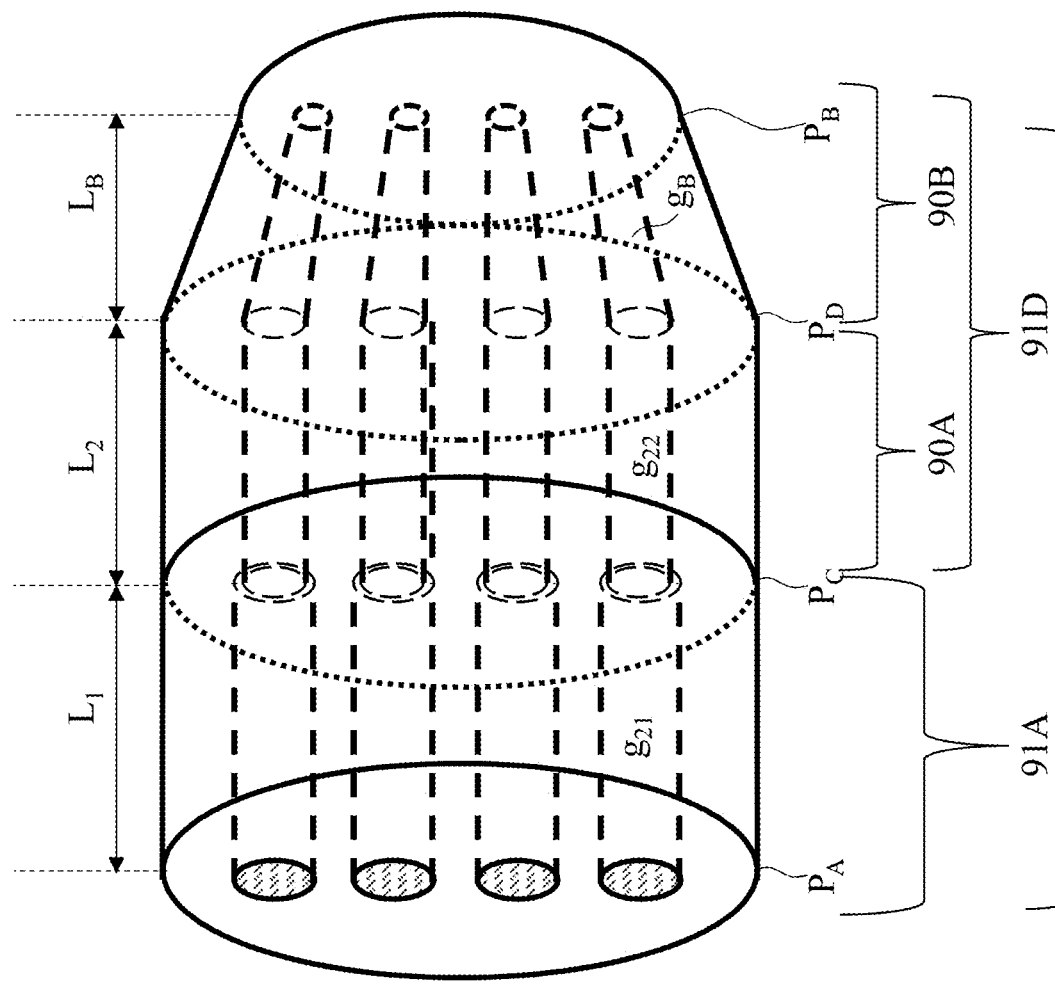
Figure 20:
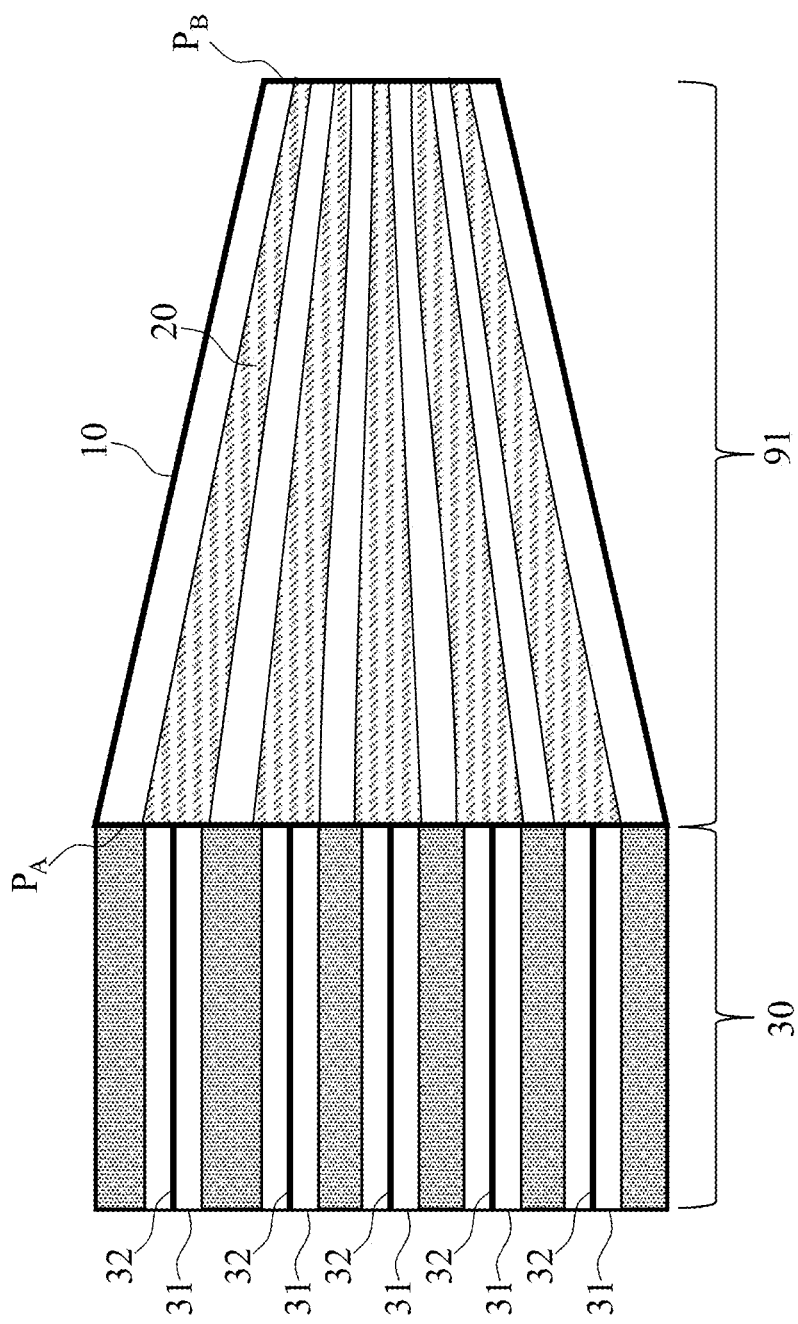
Figure 21:
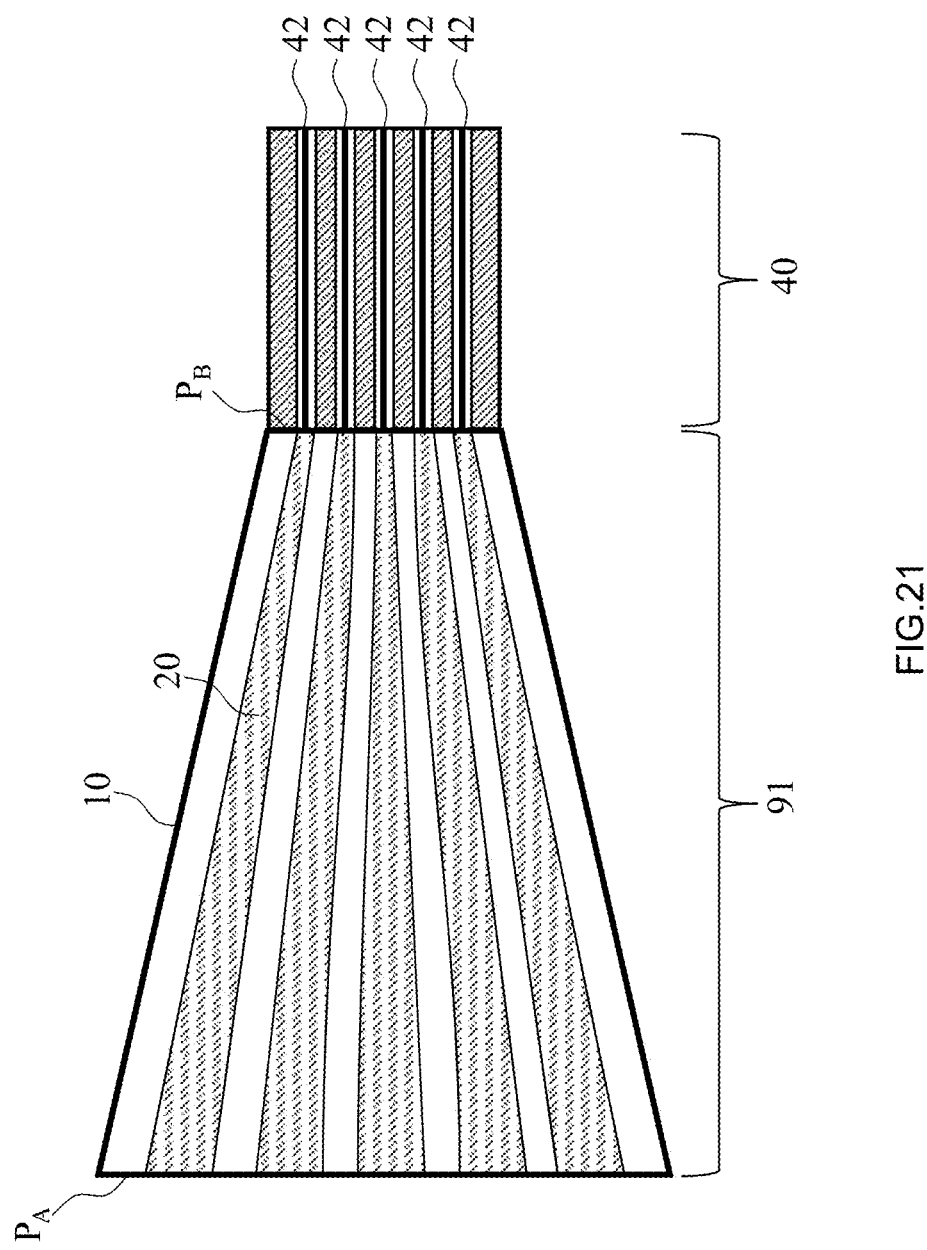
Figure 22:
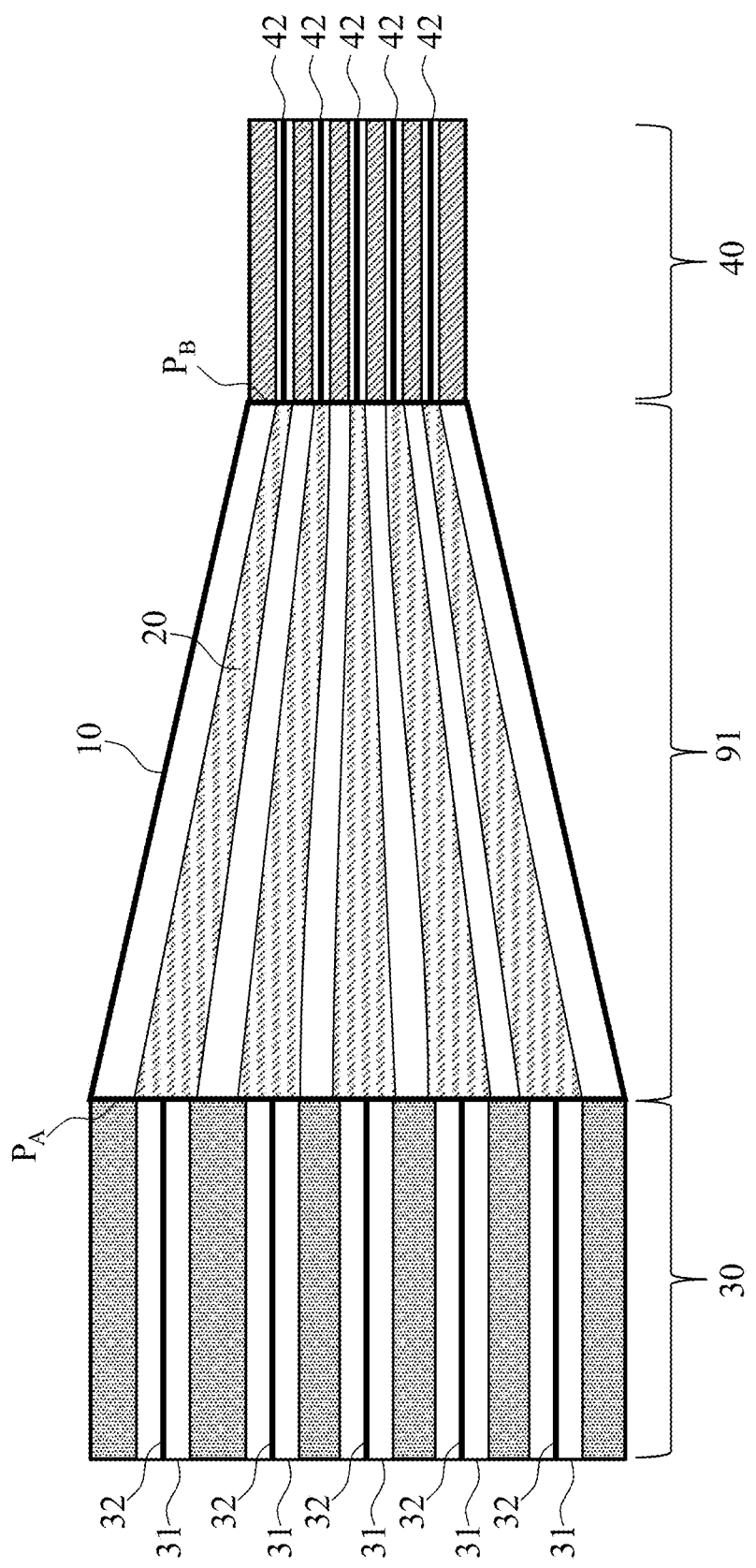
Figure 23:
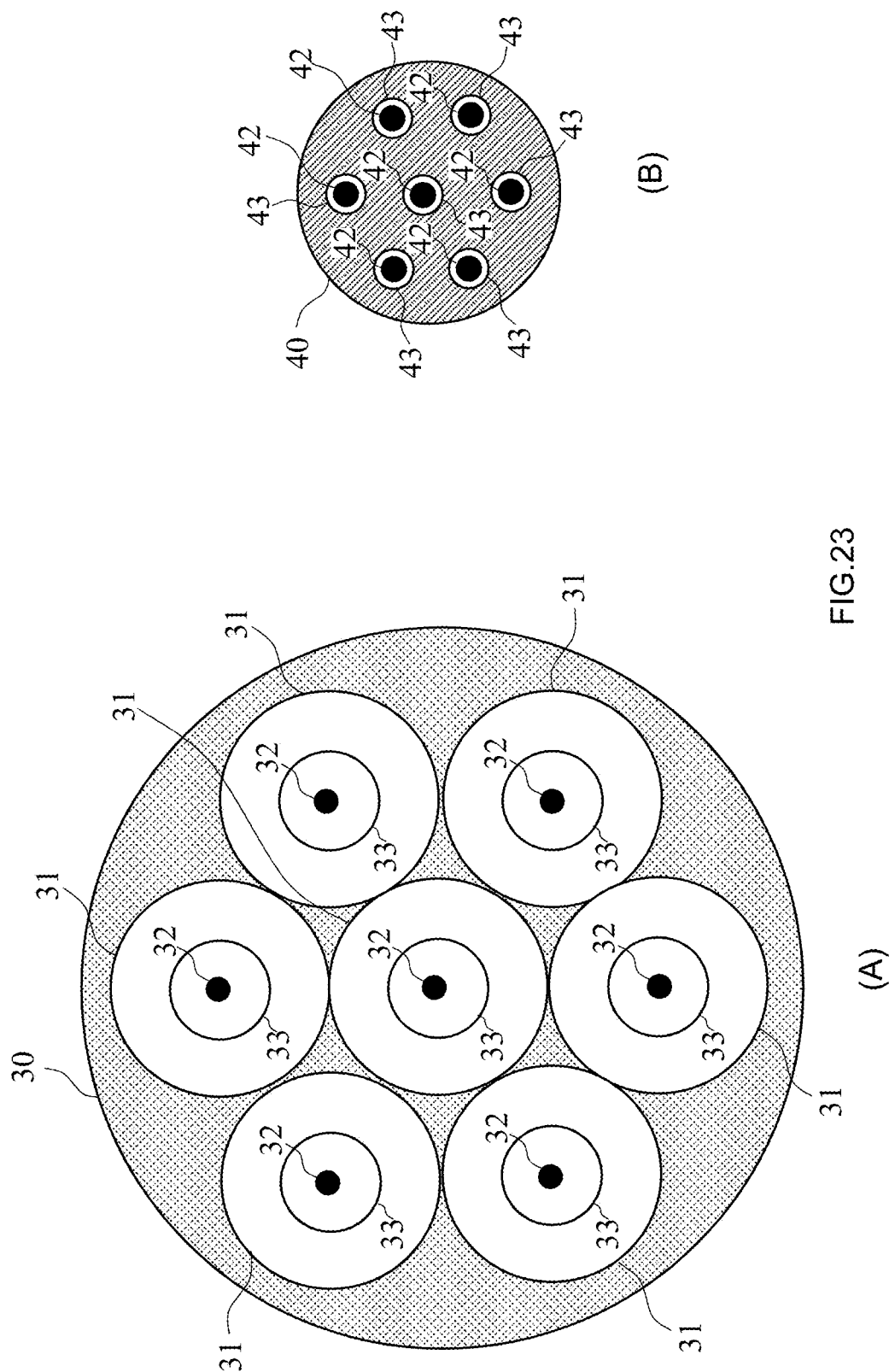

FIG. 1 shows a first configuration example of an optical component according to the present disclosure.
FIG. 2 shows a second configuration example of an optical component according to the present disclosure.
FIG. 3 shows a third configuration example of an optical component according to the present disclosure.
FIG. 4 shows a fourth configuration example of an optical component according to the present disclosure.
FIG. 5 shows a first refractive index distribution example of a graded index lens.
FIG. 6 shows a second refractive index distribution example of a graded index lens.
FIG. 7 shows a third refractive index distribution example of a graded index lens.
FIG. 8 shows an example of a ray trajectory in a graded index lens.
FIG. 9 shows a specific example of a cross-sectional shape of an optical component in which four graded index lenses are arranged in a row.
FIG. 10 shows a specific example of a cross-sectional shape of an optical component in which eight or more graded index lenses are arranged.
FIG. 11 shows a configuration example of an optical component according to a first embodiment.
FIG. 12 shows an application example to a first configuration example of the optical component of the first embodiment.
FIG. 13 shows an application example to a second configuration example of the optical component of the first embodiment.
FIG. 14 shows a first refractive index distribution example of a graded index lens according to the first embodiment.
FIG. 15 shows a second refractive index distribution example of a graded index lens according to the first embodiment.
FIG. 16 shows an example of a ray trajectory in the graded index lens of the first embodiment.
FIG. 17 shows form examples of a taper according to a second embodiment, (a) is a convex taper, (b) is a concave taper, and (c) is a linear taper.
FIG. 18 shows an analysis example of a ray trajectory when a taper angle is changed.
FIG. 19 shows a configuration example of a combination of optical components according to the first and second embodiments.
FIG. 20 shows an example of an optical connection component with a graded index lens according to a third embodiment.
FIG. 21 shows an example of an optical connection component with a graded index lens according to a fourth embodiment.
FIG. 22 shows an example of an optical connection component with a graded index lens according to a fifth embodiment.
FIG. 23 shows an example of an optical fiber array and a multi-core fiber connected to an optical component of the present disclosure.

DETAILED DESCRIPTION OF THE PREFERRED EMBODIMENT

Hereinafter, embodiments of the present disclosure will be described in detail with reference to the drawings. It should be noted that the present disclosure is not limited to the following embodiments. Examples of these embodiments are exemplary only, and the present disclosure can be implemented in a variety of modifications and improvements on the basis of the knowledge of those skilled in the art. It should also be noted that the components of the same reference numerals in the present specification and the drawings are assumed to indicate those identical to each other.

(Basic Configuration)

FIGS. 1 to 4 show the first to the fourth configuration examples of an optical component according to the present disclosure. An optical component 91 according to the first to fourth configuration examples is an optical component using a capillary type lens array composed of plural graded index lenses 20 each of which is surrounded with a capillary 10 in all circumferential directions. The capillary 10 is a glass capillary mainly composed of silica such as quartz glass. The graded index lens 20 is a cylindrical lens having a refractive index distribution in the radial direction, and in the present disclosure, a glass mainly composed of silica is used in which the metal concentration is distributed. A plurality of graded index lenses 20 is disposed along the long axis direction of the capillary 10.

The distribution of the refractive index n of the graded index lens 20 is expressed by the following equation.

$$n^2(r) = n_0^2 \{1 - (gr)^2\} \quad \text{(Equation 2)}$$

where n(r) is the refractive index at a position distant radially from the optical axis by the distance r, $n_0$ is the refractive index on the optical axis, and g is the refractive index distribution constant.

In a case in which the optical axis of the graded index lens 20 at one end $P_A$ of the optical component 91 is a light emission point, regarding the graded index lens 20, the light transmitted through the graded index lens 20 from the one end $P_A$ of the optical component 91 converges to the optical axis of the graded index lens 20 for each 0.5 pitch. Here, the one end $P_A$ and the other end $P_B$ are respectively the one end $P_A$ and the other end $P_B$ of the optical component 91 in the optical axis direction of the graded index lens 20.

The pitch P of the graded index lens 20 is a number of dimensionless, and is expressed by the following equation.

$$P = 2\pi/g \quad \text{(Equation 3)}$$

From Equation (3), it can be found that the pitch P becomes smaller as the refractive index distribution constant g becomes larger.

The refractive index distribution constant g is expressed by the following equation.

[Equation 4]

$$g = \frac{1}{r_1} * \sqrt{1 - \left(\frac{n_1}{n_0}\right)^2} \quad (4)$$

where $r_1$ is the lens radius of the graded index lens 20.

From Equation (4), it can be found that the refractive index distribution constant g becomes large as the refractive index $n_0$ on the optical axis becomes large, and as the lens radius $r_1$ of the graded index lens 20 becomes small, the refractive index distribution constant g becomes large. Therefore, it is possible to make large the NA of the graded index lens 20 effectively by making large the refractive index $n_0$ on the optical axis or by making small the lens radius $r_1$ of the graded index lens 20 and making large the refractive index distribution constant g by at least either of these.

In the present disclosure, in the optical component 91 using the capillary type lens array, in a case in which the refractive index distribution constant of the region 90A of the length $L_A$ from one end $P_A$ to the point $P_C$ is $g_A$, and the refractive index distribution constant of the region 90B of the length $L_B$ from the point $P_C$ to the other end $P_B$ is $g_B$, $g_B$ is larger than $g_A$. In order to make $g_B$ larger than $g_A$, it is only required to make the refractive index no on the optical axis of the region 90B larger than the region 90A or to make the lens radius of the graded index lens 20 of the region 90B smaller than the region 90A.

FIGS. 5 to 7 show an example of a refractive index distribution of the graded index lens 20. The reference numerals in the figure are as follows. $n_A(r)$ shows the refractive index distribution of the graded index lens 20 at the one end $P_A$ and at the point $P_C$. $n_{OA}$ shows the refractive index on the optical axis of the graded index lens 20 at the one end $P_A$ and the point $P_C$. $n_B(r)$ shows the refractive index distribution of the graded index lens 20 at the other end $P_B$. $n_{OB}$ shows the refractive index on the optical axis of the graded index lens 20 at the other end $P_B$. $R_A$ shows the lens radius of the plurality of graded index lens 20 at the one end $P_A$ and the point $P_C$ of the optical component 91. $R_B$ shows the lens radius of the plurality of graded index lens 20 at the other end $P_B$ of the optical component 91.

The first configuration example of the optical component shown in FIG. 1 is a specific example of the first refractive index distribution example shown in FIG. 5, and the lens radius of the graded index lens 20 of the regions 90A and 90B are equal. In the first refractive index distribution example, the $g_B$ is set to be larger than $g_A$ by making the $n_{OB}$ larger than $n_{OA}$.

The second configuration example of the optical component shown in FIG. 2 is a specific example of the second refractive index distribution example shown in FIG. 6 and the third refractive index distribution example shown in FIG. 7, and the lens radius of the graded index lens 20 of the regions 90A and 90B has different constant values. In the second refractive index distribution example, the $g_B$ is set to be larger than $g_A$ by making $R_B$ smaller than $R_A$. The second refractive index distribution example can make $n_{OA}$ and $n_{OB}$ equal as shown in FIG. 6. In the third refractive index distribution example, $R_B$ is made smaller than $R_A$, and furthermore, $n_{OB}$ is made larger than $n_{OA}$. The third refractive index distribution example can further make larger the difference between $g_B$ and $g_A$ as compared to the second refractive index distribution example. Furthermore, in the third refractive index distribution example, as shown in FIG. 7, $n_A(r_C) = n_B(r_C) = n_C$. Therefore, by allowing light from the region 90A to enter the region 90B at the position of $r_C$, it is possible to prevent the reflection of the light at the point $P_C$.

The third configuration example of the optical component shown in FIG. 3 and the fourth configuration example of the optical component shown in FIG. 4 are specific examples of the second refractive index distribution example shown in FIG. 6 and the third refractive index distribution example shown in FIG. 7, and the graded index lens 20 of the region 90B has a tapered shape in which the lens radius gradually becomes small. That is, in the second refractive index distribution example and the third refractive index distribution example, by gradually decreasing r of the region 90B from $R_A$ to $R_B$, $g_B$ is made larger than $g_A$. Although the outer diameter of the capillary 10 of the region 90A and 90B in the third configuration example of the optical component is constant, the outer diameter of the capillary 10 of the region 90B in the fourth configuration example of the optical component is also tapered.

A method of manufacturing the first configuration example to the fourth configuration example of the optical component is arbitrary. For example, regions 90A and 90B are manufactured as individual capillary type lens arrays and connected to each other with an adhesive or melting. For the individual capillary type lens array, for example, a through hole is provided in the capillary 10 to fix the graded index lens 20 in the through hole. With regard to the first configuration example to the third configuration example of the optical component, the outer diameter of the capillary 10 of the region 90A and 90B is arbitrary; however, it is preferable that the outer diameter be constant from the viewpoint of product yield.

FIG. 8 shows an example of the ray trajectory in the graded index lens 20. The length $L_A$ of the region 90A is a length which exceeds ¼ pitch where light transmitted through the graded index lens 20 from the one end $P_A$ of the optical component 91 begins to converge in a case in which the optical axis of the graded index lens 20 at the one end $P_A$ of the optical component 91 is a light emission point. The region 90A from the one end $P_A$ of the optical component 91 to the point $P_C$ is set to have a constant refractive index distribution constant $g_A$, and the refractive index distribution constant is switched to $g_B$ larger than $g_A$ at the point $P_C$. This allows the ray to converge at the other end $P_B$ of the optical component 91, effectively making the NA large.

In the present disclosure, since the refractive index distribution constant is switched to $g_B$ at the point $P_C$, the light transmitted through the graded index lens 20 at the one end $P_A$ of the optical component 91 converges before ½ pitch in a case in which the optical axis of the graded index lens 20 at the one end $P_A$ of the optical component 91 is a light emission point. That is, in the present disclosure, the length in the optical axis direction of the graded index lens 20 of the optical component 91 ($L_A+L_B$) is shorter than the length to the point where the light transmitted through the graded index lens 20 from the one end $P_A$ of the optical component 91 first converges (the point of ½ pitch shown in FIG. 8), in a case in which the optical axis of the graded index lens 20 at the one end $P_A$ of the optical component 91 is a light emission point. Therefore, the emitting angle at the other end $P_B$ is larger than the point of ½ pitch, and the NA is made larger.

FIGS. 9 and 10 show a specific example of a cross-sectional shape of the optical component according to the present disclosure. In FIG. 9, an example is shown in which graded index lenses 20 are arranged in one row in one capillary 10. The number of graded index lenses 20 is arbitrary, and, for example, the number may be four as shown in FIG. 9, may be eight as shown in FIG. 10(a) and FIG. 10(b), or may be any number more than eight as shown in FIG. 10(c) and FIG. 10(d).

The outer peripheral shape in the cross section of the capillary 10 is arbitrary. For example, the outer peripheral shape may be a circular as shown in FIGS. 1 to 4, may be a shape in which a notch 15 is provided at a portion of the outer periphery as shown in FIG. 9, or may be a rectangular as shown in FIG. 10(d).

The cross-sectional shape of the optical component according to the present disclosure may be a shape of a connector such as a mechanical transfer (MT) connector as shown in FIG. 10(d). Furthermore, the capillary 10 may be provided with a through hole 16 for inserting a guide pin.

As described above, in the present disclosure, as compared with the one end $P_A$ of the optical component 91, it is possible to make large the NA of the other end $P_B$ of the optical component 91. Here, in the present disclosure, since the capillary type lens array is used, it is possible to perform arraying without using a glass substrate having a V groove.

Furthermore, in the capillary type lens array of the present disclosure, since the plurality of graded index lenses 20 made of glass is covered with a glass capillary 10, it is possible to perform its production with good yield by using melt drawing. Accordingly, in the present disclosure, in the optical component having the NA conversion function, it is possible to perform arraying without reducing the product yield and without enlarging the component.

First Embodiment

FIG. 11 shows a configuration example of an optical component according to the present embodiment. In an optical component 91 according to the present embodiment, a plurality of capillary type lens arrays 91A, 91B, and 91C is connected in order from one end $P_A$ of the optical component 91 to the other end $P_B$ in the optical axis direction of the graded index lens 20. The refractive index distribution constant of the graded index lens 20 provided in the capillary type lens array 91A is $g_{21}$, the refractive index distribution constant of the graded index lens 20 provided in the capillary type lens array 91B is $g_{22}$, and the refractive index distribution constant of the graded index lens 20 provided in the capillary type lens array 91C is $g_{23}$. The refractive index distribution constant $g_{21}$, $g_{22}$, and $g_{23}$ are different for each capillary type lens array 91A, 91B, and 91C, and are $g_{21}<g_{22}<g_{23}$. In the present embodiment, when the number of the capillary type lens arrays to be connected is 3; however, the number of the capillary type lens arrays to be connected may employ any number of 2 or more.

In the present embodiment, the capillary type lens array 91A is disposed on one end $P_A$ side of the optical component 91. Therefore, in the present embodiment, the capillary type lens array 91A functions as a first capillary type lens array. A connection plane of the capillary type lens array 91A and 91B is disposed at the point $P_C$. Therefore, in the present embodiment, the capillary type lens array 91B functions as a second capillary type lens array.

FIG. 12 shows an application example of an optical component according to the present embodiment to the first configuration example of the optical component shown in FIG. 1. FIG. 13 shows an application example of an optical component according to the present embodiment to the second configuration example of the optical component shown in FIG. 2. In the capillary type lens arrays 91A, 91B, and 91C, the plural graded index lenses 21, 22, and 23 each of which are respectively surrounded with the capillaries 11, 12, and 13 in all circumferential directions. The positions of the graded index lenses 21, 22, and 23 with respect to the outer periphery of the capillaries 11, 12, and 13 are equal in the capillary type lens arrays 91A, 91B, and 91C so that the optical axes of the graded index lenses 21, 22, and 23 are arranged in the same straight line. For example, the interval $D_{21}$ of the optical axis of the graded index lens 21, the interval $D_{22}$ of the optical axis of the graded index lens 22, and the interval $D_{23}$ of the optical axis of the graded index lens 23 are equal.

FIG. 14 shows an example of the refractive indices $n_{21}$, $n_{22}$, and $n_{23}$ of the graded index lenses 21, 22, and 23 shown in FIG. 12. In the application example to the first configuration example of the optical component shown in FIG. 12, the lens radii $R_{21}$, $R_{22}$, and $R_{23}$ of the graded index lenses 21, 22, and 23 are equal, and the outer diameters $\Phi_{11}$, $\Phi_{12}$, and $\Phi_{13}$ of the capillaries 11, 12, and 13 are also equal. The refractive indices $n_{021}$, $n_{022}$, and $n_{023}$ on the optical axis of the graded index lenses 21, 22, and 23 are made larger in the order of the graded index lens 21, 22, and 23 ($n_{021} < n_{022} < n_{023}$).

FIG. 15 shows an example of the refractive index distributions $n_{21}(r)$, $n_{22}(r)$, and $n_{23}(r)$ of the graded index lenses 21, 22, and 23 shown in FIG. 13. In the application example of the optical component shown in FIG. 13 to the second configuration example, the lens radii $R_{21}$, $R_{22}$, and $R_{23}$ of the graded index lenses 21, 22, and 23 are made smaller in order, and the outer diameters $\Phi_{11}$, $\Phi_{12}$, and $\Phi_{13}$ of the capillaries 11, 12, and 13 are equal. The refractive index $n_{021}$, $n_{022}$, and $n_{023}$ on the optical axis of the graded index lenses 21, 22, and 23 may be equal as shown in FIG. 15, or alternatively, may be different as shown in FIG. 14.

In the configuration of FIGS. 12 and 13, the outer diameters $\Phi_{11}$, $\Phi_{12}$, and $\Phi_{13}$ of the capillaries 11, 12, and 13 are equal, the positions of the graded index lenses 21, 22, and 23 with respect to the outer periphery of the capillaries 11, 12, and 13 are equal in the capillary type lens arrays 91A, 91B, and 91C. Therefore, in the present embodiment, by connecting the capillary type lens arrays 91A, 91B, and 91C so that the outer peripheral shapes of the capillaries 11, 12, and 13 coincide, the graded index lenses 21, 22, and 23 can be connected.

FIG. 16 shows an example of a ray trajectory in a combination in which the refractive indices on the optical axis shown in FIG. 15 by the graded index lenses 21, 22, and 23 are the same, and the lens radii of $R_{21}$, $R_{22}$, and $R_{23}$ are made smaller in this order. The region of the lens length $z=L_1$ in the figure shows the graded index lens 21, the region of the lens length $z=L_2$ in the figure shows the graded index lens 22, and the region of the lens length $z=L_3$ in the figure shows the graded index lens 23.

The lengths $L_1$, $L_2$, and $L_3$ of the capillary type lens arrays 91A, 91B, and 91C are each predetermined in accordance with the ray trajectory. For example, the length $L_1$ is made longer than ¼ pitch so that the light with the optical axis of the graded index lens 21 at one end $P_A$ of the optical component 91 as a light emission point begins to converge. Furthermore, $L_1$ is set so that the distance $r_C$ from the optical axis of the incident light from the graded index lens 21 to the graded index lens 22 at the point PC is smaller than the lens radius $R_{22}$ of the graded index lens 22.

Similarly, the length $L_2$ is set so that the distance m from the optical axis of the incident light from the graded index lens 22 to the graded index lens 23 at the point PD is smaller than the lens radius $R_{23}$ of the graded index lens 23.

The length $L_3$ is defined on the basis of the ray trajectory to the point where the light with the optical axis of the graded index lens 21 at the one end $P_A$ of the optical component 91 as a light emission point converges first at the other end $P_B$ or the outside of the optical component 91. The incident light here assumes light propagating through the most peripheral portion most away from the optical axis of the propagating light of the graded index lens 21.

Furthermore, the length $L_3$ is a length in which the incident light from the graded index lens 22 is curved by the graded index lens 23 and converges to the optical axis or before the incident light from the graded index lens 22 is curved by the graded index lens 23 and converges to the optical axis. Thus, the light with the optical axis of the graded index lens 21 at the one end $P_A$ of the optical component 91 as a light emission point can be converged at the other end $P_B$ or the outside of the optical component 91.

Here, it is preferable that the length $L_3$ of the capillary type lens array 91C disposed on the other end $P_B$ of the optical component 91 is 0.1 mm or more. Thus, the connection of the capillary type lens array 91C in the manufacturing and connecting step of the capillary type lens array 91C in the melt-drawing step to be described later will be easy.

A description will be given of a method of manufacturing an optical component according to the present embodiment. The method of manufacturing an optical component according to the present embodiment is a method of manufacturing an optical component 91 according to the present embodiment, and the method includes a melt-drawing step and a connecting step.

In the melt-drawing step, the capillary type lens arrays 91A, 91B, and 91C shown in FIG. 12 or 13 are manufactured. The refractive index distribution constants $g_{21}$, $g_{22}$, and $g_{23}$ of the graded index lenses 21, 22, and 23 shown in FIGS. 12 and 13 are different, respectively. Therefore, the capillary type lens arrays 91A, 91B, and 91C are manufactured individually by melt-drawing a rod of glass. In the present disclosure, since the capillary type lens arrays 91A, 91B, and 91C are manufactured using the melt drawing, it is possible to mass-produce the capillary type lens arrays 91A, 91B, and 91C with good yield.

For example, in the case of the capillary type lens array 91A shown in FIG. 12, a rod of glass serving as a base material of the capillary having a common outer diameter to the capillary type lens arrays 91A, 91B, and 91C, and a graded index lens having a common no to the graded index lenses 21, 22, and 23 and a diameter corresponding to $R_{21}$ are prepared. Here, in the present disclosure, since the melt drawing is employed, a graded index lens having a diameter corresponding to and a larger diameter than $R_{21}$ is prepared. Then, a plurality of through holes corresponding to the number of arrays provided in the rod of glass is provided, the graded index lens having a diameter corresponding to $R_{21}$ is inserted into each through hole, and the melt-drawing is performed so that the outer diameter of the rod of glass is set to be $\Phi_{11}$ and the lens radius of the graded index lens 21 is set to be $R_{21}$. For the through holes, machining is employed, for example. Then, cutting and polishing are performed so that the length of the capillary type lens array 91A becomes $L_1$. Thus, it is possible to manufacture the capillary type lens array 91A. The same method applies to the capillary type lens arrays 91B and 91C.

For example, in the case of the capillary type lens array 91A shown in FIG. 13, a rod of glass serving as a base material of the capillary having a common outer diameter to the capillary type lens arrays 91A, 91B, and 91C, and a graded index lens having a diameter corresponding to $R_{21}$ and the refractive indices $n_{021}$ on the optical axis are prepared. Here, in the present disclosure, since the melt drawing is employed, a graded index lens having a diameter corresponding to and a larger diameter than $R_{21}=R_{22}=R_{23}$ is prepared. Then, a plurality of through holes corresponding to the number of arrays provided in the rod of glass is provided, the graded index lens having the refractive index $n_{021}$ corresponding to graded index lens 21 is inserted into each through hole, and the melt-drawing is performed so that the outer diameter of the rod of glass is set to be $\Phi_{11}$ and the lens radius of the graded index lens 21 is set to be $R_{21}=R_{22}=R_{23}$. Then, cutting and polishing are performed so that the length of the capillary type lens array 91A becomes $L_1$. Thus, it is possible to manufacture the capillary type lens array 91A. The same applies to the capillary type lens arrays 91B and 91C.

Here, the graded index lens to be prepared in the melt-drawing step is preferably manufactured using by a rod vapor-phase axial deposition (VAD) method. This enables a large rod, and makes it possible to be hardly affected by the transmission characteristics even if subjected to melt-drawing.

In the melt-drawing step, the capillary type lens arrays 91A, 91B, and 91C each having an equal outer shape in a cross section perpendicular to the optical axis direction of the graded index lens 21, 22, and 23 are manufactured. For example, the capillary type lens arrays 91A, 91B, and 91C having equal outer diameters $\Phi_{11}$, $\Phi_{12}$, and $\Phi_{13}$ shown in FIGS. 12 and 13 are manufactured. Furthermore, when providing a plurality of through holes in the rod of glass, the plurality of through holes is each disposed at a predetermined position with the outer shapes of the capillaries 11, 12, and 13 as a reference.

Accordingly, in the present disclosure, in the manufacturing of the capillary type lens arrays 91A, 91B, and 91C, the assembly process for arraying is not required, and dimensional control is easy. Furthermore, in the capillary type lens array 91A, since a plurality of graded index lens 21 is fixed by glass without using an adhesive, the adhesive in the capillary type lens array 91A is not peeled off, and thus, its handling is easy. The same applies to the capillary type lens arrays 91B and 91C.

In the connecting step, the capillary type lens arrays 91A, 91B, and 91C are connected to each other in the optical axis direction of the graded index lenses 21, 22, and 23 so that the outer shapes of the capillary type lens arrays 91A, 91B, and 91C coincide. The connecting method of the capillary type lens arrays 91A, 91B, and 91C is arbitrary, and, for example, it is possible to employ connection by an adhesive or melting connection. In the present embodiment, since the arrangement of the graded index lenses 21, 22, and 23 is predetermined with the outer shapes of the capillaries 11, 12, and 13 as its reference, each of the graded index lenses 21, 22, and 23 provided in the capillary type lens arrays 91A, 91B, and 91C can be connected.

In the present embodiment, in the melt-drawing step, it is preferable to provide a notch at a predetermined common position on the outer periphery of the glass of the plurality of capillary type lens arrays. Thus, as shown in FIG. 9, a notch 15 is provided at a predetermined position with respect to the graded index lenses 21, 22, and 23 among the outer periphery of the capillaries 11, 12, and 13. In this case, in the connecting step, the capillary type lens arrays 91A, 91B, and 91C are connected to each other in the optical axis direction of the graded index lens so that the outer shapes of the capillary type lens arrays 91A, 91B, and 91C and the notch 15 coincide. Thus, it is possible to easily perform the connection of the graded index lenses 21, 22, and 23 in the connecting step.

It should be noted that, as in the region 90B shown in FIG. 3, in at least either of the capillary type lens arrays 91B and 91C of the present embodiment, the lens diameter of the graded index lens 20 may be tapered.

Second Embodiment

FIG. 4 shows a configuration example of an optical component according to the present embodiment. An optical component 91 according to the present embodiment has a taper in which the lens radius of the graded index lens 20 is continuously reduced from $R_A$ to $R_B$ shown in FIG. 6 from one end $P_A$ toward the other end $P_B$ at least a portion of the capillary type lens array in the optical axis direction of the graded index lens 20.

The taper can be disposed at any position in the axial direction of the graded index lens 20. In the present embodiment, as an example thereof, an example of being disposed on the other end $P_B$ side of the optical component 91 is shown, such as the region 90B shown in FIG. 4. The example of the refractive index distribution of the graded index lens 20 at the one end $P_A$, the other end $P_B$, and the point $P_C$ of the optical component 91 has been described with reference to FIG. 6. The ray trajectory of the optical component 91 has been described with reference to FIG. 8. The angle of the taper is arbitrary.

A description will be given of a method of manufacturing an optical component according to the present embodiment. The method of manufacturing an optical component according to the present embodiment includes a melt-drawing step. In the melt-drawing step in the present embodiment, a rod of glass serving as a base material of the capillary and the graded index lens are prepared, a plurality of through holes corresponding to the number of arrays is provided in the rod of glass, and the graded index lenses are each inserted into a corresponding through hole, thereby performing melt drawing. At this time, the region 90A is drawn at a constant speed, and the region 90B is drawn faster than that in the region 90A. Then, through cutting and polishing, the region 90A controlled to be $L_A$, and that of 90B is to be $L_B$. Thus, it is possible to manufacture the optical component 91 of the present embodiment.

In the present embodiment, in the manufacturing of the capillary type lens array, the assembly process of arraying is not required, and dimensional control is easy. Furthermore, since the graded index lenses 20 are arranged and fixed without using an adhesive, adhesive is peeling off does not occur. It should be noted that, in the present embodiment, the graded index lens to be prepared in the melt-drawing step is preferably manufactured using the VAD method.

FIG. 17(a) shows a form example of the first taper. The form example of the first taper is a convex taper in which the reduction amount of the lens radius of the graded index lens 20 is made larger from the point $P_C$ disposed on the one end $P_A$ side toward the other end $P_B$ side. With such a convex taper, it is possible to make the NA larger, as will be described later.

FIG. 17(b) shows a form example of the second taper. The form example of the second taper is a concave taper in which the reduction amount of the lens radius of the graded index lens 20 is made smaller from the point $P_C$ disposed on the one end $P_A$ side toward the other end $P_B$ side. In the case of such a concave taper, since the change of the refractive index distribution constant $g_B$ at the other end $P_B$ becomes smooth, it is easy to adjust the refractive index distribution constant when polishing the other end $P_B$. Therefore, it is easy to manufacture the optical component 91.

FIG. 17(c) shows a form example of the third taper. The form example of the third taper is a linear taper in which the reduction amount of the lens radius of the graded index lens 20 is constant from the point $P_C$ disposed on the one end $P_A$ side toward the other end $P_B$ side. With such a linear taper, it is easy to adjust the drawing speed in the region 90B in the melt-drawing step. Therefore, it is easy to manufacture the optical component 91.

FIG. 18 shows an analysis example of the ray trajectory when the reduction amount of the lens radius of the graded index lens 20 is changed. In FIG. 18, the lens length z displays only the region of ¼ pitch or more. $L_0$ indicates the case where the lens radius of the graded index lens 20 is kept constant at 0.5 mm. $L_{0.02}$ shows a case in which the lens radius of the graded index lens 20 is constantly reduced in the z direction by 0.02 mm. $L_{0.05}$ shows a case in which the lens radius of the graded index lens 20 is constantly reduced in the z direction by 0.05 mm. $L_{0.069}$ shows a case in which the lens radius of the graded index lens 20 is constantly reduced in the z direction by 0.069 mm. For all of $L_0$, $L_{0.02}$, $L_{0.05}$, and $L_{0.069}$, $n_0=1.477$ is used.

As shown in FIG. 18, $L_{0.02}$ draws a steep sine curve compared to $L_0$. Therefore, by increasing the reduction amount of the lens radius of the graded index lens 20, it can be found that the NA can be effectively larger. Furthermore, when comparing $L_{0.02}$, $L_{0.05}$, and $L_{0.069}$, it can be found that the NA is gradually larger effectively. However, at $L_{0.069}$, the ray trajectory is sharply curved, and if a taper angle steeper than this is applied, the ray may leak out of the graded index lens 20. In this way, the NA can be made larger by making the angle of the taper closer to the limit where the ray leaks out of the graded index lens 20.

FIG. 19 shows an example of a combination of the first embodiment and the second embodiment. In an optical component 91 shown in FIG. 19, the optical component 91 shown in FIG. 4 according to the second embodiment is disposed as a capillary type lens array 91D, instead of the capillary type lens arrays 91B and 91C shown in FIG. 13 described in the first embodiment. In this configuration, the refractive index distribution constant and the length of the region 90A provided in the capillary type lens array 91D are set to $g_{22}$ and $L_2$ respectively in the same manner as the capillary type lens array 91B.

Third Embodiment

FIG. 20 shows an example of an optical connection component with a graded index lens according to the present embodiment. The optical connection component with a graded index lens according to the present disclosure functions as a fiber array optical connection component, and an optical fiber array 30 is connected to one end $P_A$ side of the optical component 91 according to the present disclosure.

The optical fiber array 30 is any optical fiber array in which optical fibers 31 are disposed at the positions of the graded index lenses 20 at the one end $P_A$ of the optical component 91. The interval of each graded index lens 20 at the one end $P_A$ of the optical component 91 coincides with the interval of the optical fibers provided in the optical fiber array. For example, the core interval of the optical fibers of the optical fiber array and the interval of the optical axis of the graded index lens 20 are 125 µm.

For the optical component 91, any configuration of the abovementioned embodiments can be employed. FIG. 20 shows an example adopting the configuration of the region 90B shown in FIG. 4 as an example of an optical component. Thus, the optical component 91 of the present disclosure includes a configuration in which all regions of each graded index lens 20 have a tapered shape.

In particular, in the optical component 91 having a tapered shape shown in FIG. 4 described in the second embodiment, by drawing, it is possible not only to make the NA large but also to narrow the interval of the graded index lenses 20 in the other end $P_B$ of the optical component 91. Therefore, it is possible to manufacture an optical component 91 such that the interval between the graded index lenses 20 at the other end $P_B$ of the optical component 91 is 20 µm. Thus, the fiber array connected integrally with the graded index lens becomes an extremely important optical component when extracting the optical image and information including the spatial information with the optical fiber.

The present disclosure includes a form in which a multi-core fiber or optical circuit having a core 32 is connected in place of the optical fiber array 30.

Fourth Embodiment

FIG. 21 shows an example of an optical connection component with a graded index lens according to the present embodiment. The optical connection component with a graded index lens according to the present embodiment functions as a multi-core fiber optical connection component, and a multi-core fiber 40 is connected to the other end $P_B$ of the optical component 91.

The multi-core fiber 40 is any multi-core fiber where cores 42 are disposed at the position of the graded index lens 20 at the other end $P_B$ of the optical component 91. The interval of each graded index lens 20 at the other end $P_B$ of the optical component 91 coincides with the interval of the cores 42 provided in the multi-core fiber 40.

The present disclosure includes a form in which an optical circuit having the cores 42 is connected in place of the multi-core fiber 40.

Fifth Embodiment

FIG. 22 shows an example of an optical connection component with a graded index lens according to the present embodiment. In the optical connection component with a graded index lens according to the present embodiment, an optical fiber array 30 is connected to one end Pa of an optical component 91, and a multi-core fiber 40 is connected to the other end $P_B$ of the optical component 91.

The optical fiber array 30 and the multi-core fiber 40 can employ the same configuration as the third embodiment and the fourth embodiment.

The present disclosure can be adopted for the connection to the multi-core fiber 40 having the diameter of a core 42 of 10 µm and the outer diameter of 150 µm, and the optical fiber 31 having the diameter of a core 32 of 10 µm and the outer diameter of 125 µm. Thus, the present disclosure can fan out the light from each core 42 provided in the multi-core fiber 40 into individual optical fibers 31 and fan in the light from each optical fiber 31 into individual cores 42. The propagation mode of the optical fiber 31 and the multi-core fiber 40 may be a single mode or a multi-mode.

With regard to the optical component 91, it is preferable that a low refractive index layer having a lower refractive index than the refractive index of the capillary 10 (not shown) is disposed between the graded index lens 20. Thus, it is possible to prevent crosstalk in the optical component 91.

The low refractive index layer can be formed of any material to which any substance that lowers the refractive index, such as fluorine, is added. Furthermore, the low refractive index layer may be disposed at any position between the graded index lens 20; however, it is preferable to provide the low refractive index layer around the graded index lens 20. In this case, it is possible to manufacture an optical component 91 provided with a low refractive index layer by arranging the low refractive index layer in a through hole of a glass rod that serves as a base material of the capillary 10 and performing melt-drawing in a state in which the low refractive index layer is provided around the base material of the graded index lens 20.

As shown in FIG. 23, even for the multi-core fiber 40, a double cladding fiber is preferable in which a low refractive index layer 43 is disposed around the core 42 in order to prevent crosstalk. Furthermore, for the optical fiber 31, the double cladding fiber is preferable in which a low refractive index layer 33 is disposed around the core 32 in order to prevent crosstalk.

INDUSTRIAL APPLICABILITY

The present disclosure can be applied to medical and industrial endoscopes, bio-analysis and bio-observation, imaging of intracerebral nervous reactions, and the information and communication industry.

REFERENCE SIGNS LIST

10, 11, 12, 13 Capillary
15 Notch
16 Through hole
20, 21, 22, 23 Graded index lens
30 Optical fiber array
31 Optical fiber
32, 42 Core
33, 43 Low refractive index layer
40 Multi-core fiber
90A, 90B Region
91 Optical component
91A, 91B, 91C, 91D Capillary type lens array

What is claimed is:

1. An optical component using a capillary type lens array composed of plural graded index lenses each of which is surrounded with glass in all circumferential directions,
wherein a refractive index distribution constant of the plurality of graded index lenses at one end of the optical component in an optical axis direction of the graded index lens is smaller than a refractive index distribution constant of the plurality of graded index lenses at other end of the optical component in the optical axis direction of the graded index lens, and
wherein a length in the optical axis direction of the graded index lens of the optical component is shorter than a length to a point where light transmitted through the graded index lens from the one end of the optical component first converges in a case in which an optical axis of the graded index lens at the one end of the optical component is a light emission point.

2. The optical component according to claim 1,
wherein a lens radius of the plurality of graded index lenses at the other end of the optical component is smaller than a lens radius of the plurality of graded index lenses at the one end of the optical component.

3. The optical component according to claim 1,
wherein the refractive index distribution constant of the plurality of graded index lenses at the one end of the optical component is constant from the one end to a ¼ pitch of the optical component.

4. An optical connection component with a graded index lens comprising:
an optical component according to claim 1; and
a plurality of optical fibers connected to the graded index lens disposed at one end of the optical component.

5. An optical connection component with a graded index lens comprising:
an optical component according to claim 1; and
a multi-core fiber connected to other end of the optical component.

* * * * *